US010890306B2

(12) United States Patent
Tessmer et al.

(10) Patent No.: US 10,890,306 B2
(45) Date of Patent: Jan. 12, 2021

(54) LIGHTGUIDE LENS FOR A VEHICLE HEADLIGHT

(71) Applicant: DOCTER OPTICS SE, Neustadt an der Orla (DE)

(72) Inventors: Manuel Tessmer, Jena (DE); Mohsen Mozaffari-Afshar, Gera (DE); Siemen Kühl, Munich (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 0 days.

(21) Appl. No.: 16/853,871

(22) Filed: Apr. 21, 2020

(65) Prior Publication Data

US 2020/0248883 A1    Aug. 6, 2020

Related U.S. Application Data

(63) Continuation of application No. 15/766,552, filed as application No. PCT/EP2016/001567 on Sep. 19, 2016, now Pat. No. 10,634,301.

(30) Foreign Application Priority Data

Oct. 7, 2015 (DE) .......................... 10 2015 012 924
Jan. 28, 2016 (DE) .......................... 10 2016 000 862
(Continued)

(51) Int. Cl.
*B60Q 1/04* (2006.01)
*F21S 41/27* (2018.01)
(Continued)

(52) U.S. Cl.
CPC ............. *F21S 41/27* (2018.01); *F21S 41/147* (2018.01); *F21S 41/155* (2018.01); *F21S 41/24* (2018.01);
(Continued)

(58) Field of Classification Search
CPC .. F21S 41/25; F21S 41/10; F21S 41/24; F21S 41/322; B60Q 1/04
See application file for complete search history.

(56) References Cited

U.S. PATENT DOCUMENTS 5,931,576 A * 8/1999 Kreysar ................. F21S 41/24
362/552
7,073,931 B2 * 7/2006 Ishida ..................... F21S 41/43
362/539
(Continued)

FOREIGN PATENT DOCUMENTS

DE    102011118270 A1    6/2012
DE    102013006707 A1    11/2013
(Continued)

OTHER PUBLICATIONS

PCT International Search Report and Written Opinion completed by the ISA/EP on Jan. 11, 2017 and issued in connection with PCT/EP2016/001567, 11 pages.

*Primary Examiner* — Ismael Negron
(74) *Attorney, Agent, or Firm* — Barnes & Thornburg LLP

(57) ABSTRACT

The lens body includes a light input portion with a light entry face, a light tunnel extending from the light entry face and defining an optical axis, and a transition face located opposite the light entry face and curved in a plane parallel to the optical axis; a light passage section with a light exit face and coupled to the transition face, such that the transition face is imaged by the light passaged section as a light/dark boundary. An upper surface of the light tunnel defines an ellipsoid with both the maior and minor semiaxes extending in a direction orthogonal to the optical axis; the maior semiaxis being at least 1.9 times the minor semiaxis. A light source might be coupled to the lens body to form a vehicle headlight.

20 Claims, 10 Drawing Sheets

(30) Foreign Application Priority Data

Figure 1:
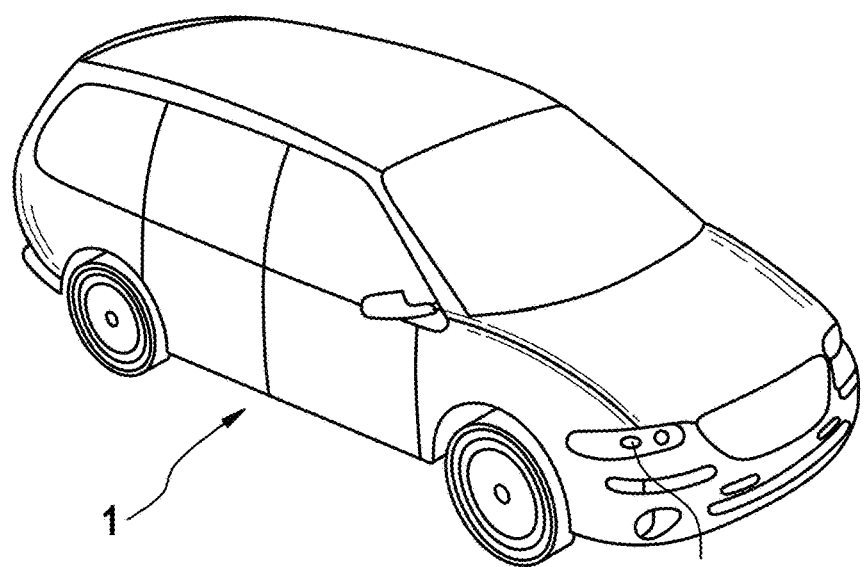

| May 17, 2016 | (DE) | ........................ 10 2016 005 836 |
| Jun. 2, 2016 | (DE) | ........................ 10 2016 006 605 |
| Jun. 17, 2016 | (DE) | ........................ 10 2016 007 346 |

(51) Int. Cl.
    *F21S 41/24*     (2018.01)
    *F21S 41/265*     (2018.01)
    *F21S 41/32*     (2018.01)
    *F21S 41/147*     (2018.01)
    *F21S 41/155*     (2018.01)
    *G02B 19/00*     (2006.01)

(52) U.S. Cl.
    CPC ........... *F21S 41/265* (2018.01); *F21S 41/322* (2018.01); *G02B 19/0028* (2013.01); *G02B 19/0061* (2013.01)

(56) References Cited

U.S. PATENT DOCUMENTS

| 7,401,947 | B2 * | 7/2008 | Wanninger | ........... G02B 6/0096 |
| | | | | 362/300 |
| 7,607,804 | B2 | 10/2009 | Wanninger | |
| 7,611,272 | B2 * | 11/2009 | Specht | ................. F21S 41/663 |
| | | | | 362/555 |
| 7,810,975 | B2 | 10/2010 | Specht | |
| 8,801,242 | B2 | 8/2014 | Hamm | |
| 8,851,722 | B2 | 10/2014 | Fedosik | |
| 8,944,649 | B2 * | 2/2015 | Fedosik | ................ F21S 41/147 |
| | | | | 362/511 |
| 9,447,939 | B2 | 9/2016 | Wintzer | |
| 9,664,352 | B2 * | 5/2017 | Scheibner | ............... F21S 41/27 |
| 9,719,648 | B2 | 8/2017 | Lo | |
| 9,719,649 | B2 | 8/2017 | Wintzer | |
| 9,822,947 | B2 | 11/2017 | Owada | |
| 10,288,248 | B1 | 5/2019 | Crespin | |
| 2013/0242590 | A1 | 9/2013 | Fedosik | |
| 2013/0250597 | A1 | 9/2013 | Fedosik | |
| 2013/0258694 | A1 | 10/2013 | Fedosik | |
| 2013/0272011 | A1 | 10/2013 | Fedosik | |
| 2014/0060956 | A1 | 3/2014 | Takai | |
| 2015/0062950 | A1 | 3/2015 | Fedosik | |
| 2015/0124472 | A1 | 5/2015 | Wintzer | |
| 2015/0330590 | A1 | 11/2015 | Wintzer | |
| 2017/0261169 | A1 | 9/2017 | Fedosik | |
| 2019/0170315 | A1 | 6/2019 | Matsuda | |

FOREIGN PATENT DOCUMENTS

| DE | 102013007072 A1 | 3/2014 |
| JP | 2010170836 A | 8/2010 |
| WO | 2012072188 A1 | 6/2012 |

* cited by examiner

LIGHTGUIDE LENS FOR A VEHICLE HEADLIGHT

PRIORITY CLAIM

This application is a Continuation of U.S. application Ser. No. 15/766,552, filed Apr. 6, 2018, which is a U.S. counterpart application of international application serial No. PCT/EP2016/001567, filed Sep. 19, 2016, which claims priority to German Patent Application Nos. 102015012924.4, 102016000862.8, 102016005836.6, 102016006605.9, and 102016007346.2, filed Oct. 7, 2015, Jan. 28, 2016, May 17, 2016, Jun. 2, 2016, and Jun. 17, 2016 (respectively).

The present disclosure refers to a headlight lens for a vehicle headlight, in particular for a motor vehicle headlight, wherein the headlight lens includes a monolithic body of transparent material, including at least one light entry face and at least one optically effective light exit face.

WO 2012/072188 A1 discloses a headlight lens for a motor vehicle headlight, wherein the headlight lens includes a body of transparent material, including at least one (in particular optically effective) light entry face and at least one optically effective light exit face, and wherein the body comprises a light tunnel which passes over, via a bend, into a light passage section for imaging the bend as a bright-dark-boundary.

It is in particular the object of the present disclosure to suggest an improved headlight lens for a vehicle headlight, in particular for a motor vehicle headlight.

The aforementioned object is achieved by a headlight lens for a vehicle headlight, in particular for a motor vehicle headlight, wherein the headlight lens includes a particularly press-molded, in particular monolithic body of transparent material, wherein the in particular monolithic body includes at least one light tunnel and one light passage section having at least one optically effective light exit face, wherein the light tunnel comprises at least one in particular optically effective light entry face and passes over, via a bend, into the light passage section for imaging the bend as a bright-dark-boundary by means of light coupled or irradiated into the light entry face, wherein at least a portion of the surface limiting the light tunnel in particular to the top is part of an ellipsoid whose semiaxis is, in the horizontal direction orthogonal to the optical axis of the light tunnel or to the extension of the light tunnel in the longitudinal direction, in particular longer by at least 1.9 times, in particular at least three times, in particular not more than twenty times, than its semiaxis in the vertical direction, or is part of an ellipsoid, $$E(x,z;y) = E_{a_1,b_1}(z;y) \times E_{a_2,b_2}(x;y)$$

wherein $$E_{a_1,b_1}(z;y)$$

and $$E_{a_2,b_2}(x;y)$$

are two crossed ellipses, wherein z is a coordinate in the direction of the optical axis of the light tunnel and/or in the longitudinal direction of the light tunnel, wherein y is a coordinate in the vertical direction, wherein x is a coordinate orthogonal to the y-direction and orthogonal to the z-direction, wherein $$E_{a_1,b_1}(z;y): \frac{z^2}{a_1^2} + \frac{y^2}{b_1^2} = 1$$

$$E_{a_2,b_2}(x;y): \frac{x^2}{a_2^2} + \frac{y^2}{b_2^2} = 1$$

wherein:
1.9·$b_1 \leq a_2$ and/or
3·$b_1 \leq a_2$ and/or
0<$a_1/a_2 \leq 1.5$ or 0$\leq a_1/a_2 \leq 1.5$ and/or
$a_2 \leq 20 \cdot b_1$ and/or
$a_2 \leq 50 \cdot b_1$ and/or In an advantageous embodiment of the present disclosure, one or the right side face of the light tunnel and/or one or the left side face of the light tunnel is (at least partially) concavely curved.

In one embodiment of the present disclosure, one or the right and/or one or the left side face of the light tunnel is (at least partially) curved corresponding to a Bézier curve. In a further advantageous embodiment of the present disclosure, the following applies:
$0.3 \cdot d_1 \leq s_1 \leq 0.7 \cdot d_1$ and/or
$0.4 \cdot d_2 \leq s_2 \leq 1.5 \cdot d_2$ and/or
$1.5 \leq d_1/d_2 \leq 10$ and/or
$0.3 \leq g \leq 0.7$,
if
the starting point of the Bézier curve has the coordinates 0.0,
the end point of the Bézier curve has the coordinates $d_1, d_2$,
the or one control point of the Bézier curve has the coordinates $s_1, s_2$, and/or
the or one control point of the Bézier curve has the weighting g.

In an advantageous embodiment, one or the right side face of the light tunnel and/or one or the left side face of the light tunnel is strictly concavely curved in the direction of a coordinate line. This coordinate line in one embodiment the curve that results if the side face intersects a horizontal plane and/or a plane comprising the optical axis of the headlight lens, and/or the x-z-plane. This curve will be designated with Γ below. It is here in particular intended that the radius of curvature of Γ is not smaller than 20 mm and/or not larger than 200 mm. It is in particular intended that the overall arc length Γ is not shorter than 10 mm and/or not longer than 40 mm. In a further advantageous embodiment of the present disclosure, Γ starts at the edge of the light entry face with a starting direction that is inclined with respect to the optical axis of the headlight lens (within the horizontal plane and/or within the plane comprising the optical axis of the headlight lens and/or within the x-z-plane) by an angle that is larger than 0 and/or not larger than 15°.

In a further advantageous embodiment of the present disclosure, the light tunnel is funnel-shaped, tapering towards the light entry face. In a further advantageous embodiment of the present disclosure, the right and left side faces of the light tunnel form part of a funnel tapering towards the light entry face. In one embodiment of the present disclosure, the left side face of the light tunnel is not symmetric to the right side face of the light tunnel. In one embodiment of the present disclosure, the left side face of the light tunnel is inclined with respect to the optical axis of the light tunnel. In one embodiment of the present disclosure, the right side face of the light tunnel is inclined with respect to the optical axis of the light tunnel.

In a further advantageous embodiment of the present disclosure, one surface of the light passage section, or the surface facing the light tunnel, comprises (at least in the region where it passes over into the light tunnel) a Petzval face region which is designed in the shape of an M and/or which comprises a first Petzval face and a second Petzval face different from the first Petzval face.

In a further advantageous embodiment of the present disclosure, the transition between the first Petzval face and the second Petzval face is continuous.

In a further advantageous embodiment of the present disclosure, the Petzval face region comprises at least one third Petzval face. In a further advantageous embodiment of the present disclosure, the transition between the first Petzval face and the third Petzval face is continuous. In a further advantageous embodiment of the present disclosure, the first Petzval face is disposed between the second Petzval face and the third Petzval face. In a further advantageous embodiment of the present disclosure, the first Petzval face is concavely curved. Advantageously, the radius of curvature (or the quantity thereof) of the second Petzval face and/or the third Petzval face is not smaller than 15 mm. In a further advantageous embodiment of the present disclosure, the light exit face comprises three segments, wherein it is advantageously provided that one (different) Petzval face is assigned to each segment.

In a further advantageous embodiment of the present disclosure, the light exit face comprises a plurality of segments, wherein it is advantageously provided that one Petzval face region comprises a plurality of Petzval faces, wherein it is in particular provided that one (different) Petzval face is assigned to each segment. In a further advantageous embodiment of the present disclosure, the transition between adjacent Petzval faces is continuous.

In a further advantageous embodiment of the present disclosure, the bend extends (in its longitudinal direction) following an M-shaped trajectory. In a further advantageous embodiment of the present disclosure, the bend comprises a region in which it extends (in its longitudinal direction) following an M-shaped trajectory.

An optically effective light entry face or an optically effective light exit face is an optically effective surface of the monolithic body. An optically effective surface in the sense of the present disclosure is in particular a surface of the transparent body where refraction of light occurs when the headlight lens is used according to its purpose. An optically effective surface in the sense of the present disclosure is in particular a surface where the direction of light passing through this surface is (purposefully) changed when the headlight lens is used according to its purpose.

A transparent material in the sense of the present disclosure is in particular glass. A transparent material in the sense of the present disclosure is in particular inorganic glass. A transparent material in the sense of the present disclosure is in particular silicate glass. A transparent material in the sense of the present disclosure is in particular glass as it is described in PCT/EP2008/010136. Glass in the sense of the present disclosure in particular comprises:

0.2 to 2 weight percent of $Al_2O_3$,
  0.1 to 1 weight percent of $Li_2O$,
  0.3, in particular 0.4 to 1.5 weight percent of $Sb_2O_3$,
  60 to 75 weight percent of $SiO_2$,
  3 to 12 weight percent of $Na_2O$,
  3 to 12 weight percent of $K_2O$, and
  3 to 12 weight percent of $CaO$.

Press-molded in particular means, in the sense of the present disclosure, to press an optically effective surface in such a way that a subsequent finishing of the contour of this optically effective surface may be omitted or is omitted or not intended at all. It is thus in particular intended that a press-molded surface is not polished after press-molding.

A light tunnel in the sense of the present disclosure is in particular characterized in that total reflection essentially takes place at its lateral (in particular top, bottom, right and/or left) surfaces, so that light entering through the light entry face is guided through the tunnel as a light guide. A light tunnel in the sense of the present disclosure is in particular a light guide. It is in particular intended that total reflection occurs at the surfaces at the long sides of the light tunnel. It is in particular intended that the surfaces at the long sides of the light tunnel are provided for total reflection. It is in particular intended that total reflection occurs at the surfaces of the light tunnel essentially oriented in the direction of the optical axis of the light tunnel. It is in particular intended that the surfaces of the light tunnel essentially oriented in the direction of the optical axis of the light tunnel are provided for total reflection. In an advantageous embodiment, it is intended that the light tunnel, in particular the region of the bend, has no reflective coating.

A bend in the sense of the present disclosure is in particular a curved transition. A bend in the sense of the present disclosure is in particular a transition curved with a radius of curvature of not less than 50 nm. It is in particular intended that the surface of the headlight lens does not comprise any discontinuity in the bend but a curvature. It is in particular intended that the surface of the headlight lens comprises, in the bend, a curvature in particular having a radius of curvature in the bend of not less than 50 nm. In an advantageous embodiment, the radius of curvature is not larger than 5 mm. In an advantageous embodiment, the radius of curvature is not larger than 0.25 mm, in particular not larger than 0.15 mm, advantageously not larger than 0.1 mm. In a further advantageous embodiment of the present disclosure, the radius of curvature in the bend is at least 0.05 mm. It is in particular intended that the surface of the headlight lens is press-molded in the region of the bend.

In a further advantageous embodiment of the present disclosure, the orthogonal of the light entry face is inclined with respect to the optical axis of the light passage section, in particular at an angle between 85° and 20°, for example at an angle between 70° and 40°.

In a further advantageous embodiment of the present disclosure, the bend is curved in a first direction and in a second direction. In a further advantageous embodiment of the present disclosure, the first direction is orthogonal to the second direction.

In a further advantageous embodiment of the present disclosure, the length of the headlight lens is, in the orientation of the optical axis of the light tunnel and/or the light passage section, not more than 9 cm.

The aforementioned object is moreover achieved by a headlight lens—in particular comprising one or several ones of the aforementioned features—for a vehicle headlight, in particular for a motor vehicle headlight, wherein the headlight lens includes a particularly press-molded, in particular monolithic body of transparent material, wherein the in particular monolithic body includes at least one light tunnel and one light passage section having at least one optically effective light exit face, wherein the light tunnel comprises at least one in particular optically effective light entry face and passes over, via a bend, into the light passage section for imaging the bend as a bright-dark-boundary by means of light coupled or irradiated into the light entry face, and wherein one or the right and/or one or the left side face of the light tunnel is (at least partially) curved concavely.

In one embodiment of the present disclosure, one or the right and/or one or the left side face of the light tunnel is curved (at least partially) corresponding to a Bézier curve. In a further advantageous embodiment of the present disclosure, the following applies:

$0.3 \cdot d_1 \leq s_1 \leq 0.7 \cdot d_1$ and/or
$0.4 \cdot d_2 \leq s_2 \leq 1.5 \cdot d_2$ and/or
$1.5 \leq d_1/d_2 \leq 10$ and/or
$0.3 \leq g \leq 0.7$,
if
the starting point of the Bézier curve has the coordinates 0.0,
the end point of the Bézier curve has the coordinates $d_1, d_2$,
the or one control point of the Bézier curve has the coordinates $s_1, s_2$, and/or
the or one control point of the Bézier curve has the weighting g.

In a further advantageous embodiment of the present disclosure, the light tunnel is funnel-shaped, tapering towards the light entry face. In a further advantageous embodiment of the present disclosure, the right and left side faces of the light tunnel form part of a funnel tapering towards the light entry face. In one embodiment of the present disclosure, the left side face of the light tunnel is not symmetric to the right side face of the light tunnel. In one embodiment of the present disclosure, the left side face of the light tunnel is inclined with respect to the optical axis of the light tunnel. In one embodiment of the present disclosure, the right side face of the light tunnel is inclined with respect to the optical axis of the light tunnel.

In an advantageous embodiment, one or the right side face of the light tunnel and/or one or the left side face of the light tunnel is strictly concavely curved in the direction of a coordinate line. This coordinate line in one embodiment the curve that results if the side face intersects a horizontal plane and/or a plane comprising the optical axis of the headlight lens and/or the x-z-plane. This curve will be designated with $\Gamma$ below. It is here in particular intended that the radius of curvature of $\Gamma$ is not smaller than 20 mm and/or not larger than 200 mm. It is in particular intended that the overall arc length $\Gamma$ is not shorter than 10 mm and/or not longer than 40 mm. In a further advantageous embodiment of the present disclosure, $\Gamma$ starts at the edge of the light entry face with a starting direction that is inclined with respect to the optical axis of the headlight lens (within the horizontal plane and/or within the plane comprising the optical axis of the headlight lens and/or within the x-z-plane) by an angle that is larger than 0 and/or not larger than 15°.

In a further advantageous embodiment of the present disclosure, one surface of the light passage section, or the surface facing the light tunnel, comprises (at least in the region where it passes over into the light tunnel) a Petzval face region which is designed in the shape of an M and/or which comprises a first Petzval face and a second Petzval face different from the first Petzval face.

In a further advantageous embodiment of the present disclosure, the transition between the first Petzval face and the second Petzval face is continuous.

In a further advantageous embodiment of the present disclosure, the Petzval face region comprises at least one third Petzval face. In a further advantageous embodiment of the present disclosure, the transition between the first Petzval face and the third Petzval face is continuous. In a further advantageous embodiment of the present disclosure, the first Petzval face is disposed between the second Petzval face and the third Petzval face. In a further advantageous embodiment of the present disclosure, the first Petzval face is concavely curved. It is advantageously provided that the radius of curvature (or the quantity thereof) of the second Petzval face and/or the third Petzval face is not smaller than 15 mm. In a further advantageous embodiment of the present disclosure, the light exit face comprises three segments, wherein it is advantageously provided that one (different) Petzval face is assigned to each segment.

In a further advantageous embodiment of the present disclosure, the light exit face comprises a plurality of segments, wherein it is advantageously provided that one Petzval face region comprises a plurality of Petzval faces, where it is in particular provided that one (different) Petzval face is assigned to each segment. In a further advantageous embodiment of the present disclosure, the transition between adjacent Petzval faces is continuous.

In a further advantageous embodiment of the present disclosure, the bend extends (in its longitudinal direction) following an M-shaped trajectory. In a further advantageous embodiment of the present disclosure, the bend has a region in which it extends following (in its longitudinal direction) an M-shaped trajectory.

An optically effective light entry face or an optically effective light exit face is an optically effective surface of the monolithic body. An optically effective surface in the sense of the present disclosure is in particular a surface of the transparent body where refraction of light occurs when the headlight lens is used according to its purpose. An optically effective surface in the sense of the present disclosure is in particular a surface where the direction of light passing through this surface is changed when the headlight lens is used according to its purpose.

A transparent material in the sense of the present disclosure is in particular glass. A transparent material in the sense of the present disclosure is in particular inorganic glass. A transparent material in the sense of the present disclosure is in particular silicate glass. A transparent material in the sense of the present disclosure is in particular glass as it is described in PCT/EP2008/010136. Glass in the sense of the present disclosure in particular comprises 0.2 to 2 weight percent of $Al_2O_3$,
0.1 to 1 weight percent of $Li_2O$,
0.3, in particular 0.4 to 1.5 weight percent of $Sb_2O_3$,
60 to 75 weight percent of $SiO_2$,
3 to 12 weight percent of $Na_2O$,
3 to 12 weight percent of $K_2O$, and
3 to 12 weight percent of CaO.

Press-molded in particular means, in the sense of the present disclosure, to press an optically effective surface in such a way that a subsequent finishing of the contour of this optically effective surface may be omitted or is omitted or not intended at all. It is thus in particular intended that a press-molded surface is not polished after press-molding.

A light tunnel in the sense of the present disclosure is in particular characterized in that total reflection essentially takes place at its lateral (in particular top, bottom, right and/or left) surfaces, so that light entering through the light entry face is guided through the tunnel as light guide. A light tunnel in the sense of the present disclosure is in particular a light guide. It is in particular intended that total reflection occurs at the long sides of the surfaces of the light tunnel. It is in particular intended that the long sides of the surfaces of the light tunnel are provided for total reflection. It is in particular intended that total reflection occurs at the surfaces of the light tunnel essentially oriented in the direction of the optical axis of the light tunnel. It is in particular intended that the surfaces of the light tunnel essentially oriented in the direction of the optical axis of the light tunnel are provided for total reflection. In an advantageous embodiment, it is intended that the light tunnel, in particular the region of the bend, has no reflective coating.

A bend in the sense of the present disclosure is in particular a curved transition. A bend in the sense of the present disclosure is in particular a transition curved with a radius of curvature of not less than 50 nm. It is in particular intended that the surface of the headlight lens does not comprise any discontinuity in the bend but a curvature. It is in particular intended that the surface of the headlight lens comprises, in the bend, a curvature in particular having a radius of curvature in the bend of not less than 50 nm. In an advantageous embodiment, the radius of curvature is not larger than 5 mm. In an advantageous embodiment, the radius of curvature is not larger than 0.25 mm, in particular not larger than 0.15 mm, advantageously not larger than 0.1 mm. In a further advantageous embodiment of the present disclosure, the radius of curvature in the bend is at least 0.05 mm. It is in particular intended that the surface of the headlight lens is press-molded in the region of the bend.

In a further advantageous embodiment of the present disclosure, the orthogonal of the light entry face is inclined with respect to the optical axis of the light passage section in particular at an angle between 85° and 20°, for example at an angle between 70° and 40°.

In a further advantageous embodiment of the present disclosure, the bend is curved in a first direction and in a second direction. In a further advantageous embodiment of the present disclosure, the first direction is orthogonal to the second direction.

In a further advantageous embodiment of the present disclosure, the length of the headlight lens is, in the orientation of the optical axis of the light tunnel and/or the light passage section, not more than 9 cm.

The aforementioned object is moreover achieved by a headlight lens—in particular comprising one or several ones of the aforementioned features—for a vehicle headlight, in particular for a motor vehicle headlight, wherein the headlight lens includes a particularly press-molded, in particular monolithic body of transparent material, wherein the in particular monolithic body includes at least one light tunnel and one light passage section having at least one optically effective light exit face, wherein the light tunnel comprises at least one in particular optically effective light entry face and passes over, via a bend, into the light passage section for imaging the bend as a bright-dark-boundary by means of light coupled or irradiated into the light entry face, wherein one surface of the light passage section or the surface facing the light tunnel comprises (at least in the region where it passes over into the light tunnel) a Petzval face region which is designed in the shape of an M and/or which comprises a first Petzval face and a second Petzval face different from the first Petzval face.

In a further advantageous embodiment of the present disclosure, the transition between the first Petzval face and the second Petzval face is continuous.

In a further advantageous embodiment of the present disclosure, the Petzval face region comprises at least one third Petzval face. In a further advantageous embodiment of the present disclosure, the transition between the first Petzval face and the third Petzval face is continuous. In a further advantageous embodiment of the present disclosure, the first Petzval face is disposed between the second Petzval face and the third Petzval face. In a further advantageous embodiment of the present disclosure, the first Petzval face is concavely curved. It is advantageously provided that the radius of curvature (or the quantity thereof) of the second Petzval face and/or the third Petzval face is not smaller than 15 mm. In a further advantageous embodiment of the present disclosure, the light exit face comprises three segments, wherein it is advantageously provided that one (different) Petzval face is assigned to each segment.

In a further advantageous embodiment of the present disclosure, the light exit face comprises a plurality of segments, wherein it is advantageously provided that one Petzval face region comprises a plurality of Petzval faces, wherein it is in particular provided that one (different) Petzval face is assigned to each segment. In a further advantageous embodiment of the present disclosure, the transition between adjacent Petzval faces is continuous.

An optically effective light entry face or an optically effective light exit face is an optically effective surface of the monolithic body. An optically effective surface in the sense of the present disclosure is in particular a surface of the transparent body where refraction of light occurs when the headlight lens is used according to its purpose. An optically effective surface in the sense of the present disclosure is in particular a surface where the direction of light passing through this surface is changed when the headlight lens is used according to its purpose.

A transparent material in the sense of the present disclosure is in particular glass. A transparent material in the sense of the present disclosure is in particular inorganic glass. A transparent material in the sense of the present disclosure is in particular silicate glass. A transparent material in the sense of the present disclosure is in particular glass as it is described in PCT/EP2008/010136. Glass in the sense of the present disclosure in particular comprises 0.2 to 2 weight percent of $Al_2O_3$,
0.1 to 1 weight percent of $Li_2O$,
0.3, in particular 0.4 to 1.5 weight percent of $Sb_2O_3$,
60 to 75 weight percent of $SiO_2$,
3 to 12 weight percent of $Na_2O$,
3 to 12 weight percent of $K_2O$, and
3 to 12 weight percent of $CaO$.

Press-molded in particular means, in the sense of the present disclosure, to press an optically effective surface in such a way that a subsequent finishing of the contour of this optically effective surface may be omitted or is omitted or not intended at all. It is thus in particular intended that a press-molded surface is not polished after press-molding.

A light tunnel in the sense of the present disclosure is in particular characterized in that total reflection essentially takes place at its lateral (in particular top, bottom, right and/or left) surfaces, so that light entering through the light entry face is guided through the tunnel as light guide. A light tunnel in the sense of the present disclosure is in particular a light guide. It is in particular intended that total reflection occurs at the longitudinal surfaces of the light tunnel. It is in particular intended that the long sides of the surfaces of the light tunnel are provided for total reflection. It is in particular intended that total reflection occurs at the surfaces of the light tunnel essentially oriented in the direction of the optical axis of the light tunnel. It is in particular intended that the surfaces of the light tunnel essentially oriented in the direction of the optical axis of the light tunnel are provided for total reflection. In an advantageous embodiment, it is intended that the light tunnel, in particular the region of the bend, has no reflective coating.

A bend in the sense of the present disclosure is in particular a curved transition. A bend in the sense of the present disclosure is in particular a transition curved with a radius of curvature of not less than 50 nm. It is in particular intended that the surface of the headlight lens does not comprise any discontinuity in the bend but a curvature. It is in particular intended that the surface of the headlight lens comprises, in the bend, a curvature in particular having a radius of curvature in the bend of not less than 50 nm. In an advantageous embodiment, the radius of curvature is not larger than 5 mm. In an advantageous embodiment, the radius of curvature is not larger than 0.25 mm, in particular not larger than 0.15 mm, advantageously not larger than 0.1 mm. In a further advantageous embodiment of the present disclosure, the radius of curvature in the bend is at least 0.05 mm. It is in particular intended that the surface of the headlight lens is press-molded in the region of the bend.

In a further advantageous embodiment of the present disclosure, the orthogonal of the light entry face is inclined with respect to the optical axis of the light passage section, in particular at an angle between 85° and 20°, for example at an angle between 70° and 40°.

In a further advantageous embodiment of the present disclosure, the bend is curved in a first direction and in a second direction. In a further advantageous embodiment of the present disclosure, the first direction is orthogonal to the second direction.

In a further advantageous embodiment of the present disclosure, the length of the headlight lens is, in the orientation of the optical axis of the light tunnel and/or the light passage section, not more than 9 cm.

The aforementioned object is moreover achieved by a headlight lens—in particular comprising one or several ones of the aforementioned features—for a vehicle headlight, in particular for a motor vehicle headlight, wherein the headlight lens includes a particularly press-molded, in particular monolithic body of transparent material, wherein the in particular monolithic body includes at least one light tunnel and one light passage section having at least one optically effective light exit face, wherein the light tunnel comprises at least one in particular optically effective light entry face and passes over, via a bend, into the light passage section for imaging the bend as a bright-dark-boundary by means of light coupled or irradiated into the light entry face, wherein the bend extends (in its longitudinal direction) following an M-shaped trajectory, or wherein the bend comprises a region where it extends following (in its longitudinal direction) an M-shaped trajectory.

The above mentioned object is moreover achieved by a headlight lens—in particular comprising one or several ones of the above mentioned features—for a vehicle headlight, in particular for a motor vehicle headlight, wherein the headlight lens comprises an in particular press-molded, in particular monolithic body of transparent material, wherein the in particular monolithic body comprises at least one light tunnel and one light passage section with at least one optically effective light exit face, wherein the light tunnel comprises at least one in particular optically effective light entry face and passes over, via a bend, into the light passage section for imaging the bend as a bright-dark-boundary by means of light coupled or irradiated into the light entry face, wherein it is provided with respect to the light exit face, one segment of the light exit face, several segments of the light exit face, all segments of the light exit face, a portion of the light exit face and/or an essential portion of the light exit face, that each intersection of the light exit face with a plane containing an axis y is an asphere "collimating" a light bundle from the origin (i.e. x=y=z=0) in the y-direction into infinity (LY=0 as direction cosine LZ and LX are in particular non-zero), it is, optionally in the x-direction, determined that a desired or given distribution of intensity in the x-direction, in particular on a wall, in particular on a wall of ten meters, is obtained or achieved, wherein z is a coordinate in the direction of the optical axis of the light tunnel and/or in the longitudinal direction of the light tunnel and/or the headlight lens and/or the light passage section and/or a segment of the light exit face and/or the light exit face, y is a coordinate in the vertical direction and/or an axis of rotation, and x is a coordinate orthogonal to the y-direction and orthogonal to the z-direction and/or in the horizontal direction.

In an advantageous embodiment of the present disclosure, the light exit face is segmented. In a further advantageous embodiment of the present disclosure, the light exit face comprises at least two segments. In a further advantageous embodiment of the present disclosure, the light exit face comprises at least three segments.

One segment of a light exit face in the sense of the present disclosure is in particular separated from one other or further segment of the light exit face by means of a notch or a bend. A segment of a light exit face in the sense of the present disclosure is in particular an area according to a (mathematical or geometrical) function differing from the (mathematical or geometrical) function of an adjacent segment. A segment in the sense of the present disclosure is in particular an optically effective area according to a (mathematical or geometrical) function differing from the (mathematical or geometrical) function of an adjacent segment.

The aforementioned object is moreover achieved by a headlight lens—in particular comprising one or several ones of the aforementioned features—for a vehicle headlight, in particular for a motor vehicle headlight, wherein the headlight lens includes a particularly press-molded, in particular monolithic body of transparent material, wherein the in particular monolithic body includes at least one light tunnel and one light passage section having at least one optically effective light exit face, wherein the optically effective light exit face comprises in particular at least two, in particular at least three, in particular three, in particular not more than five segments, wherein the light tunnel comprises at least one in particular optically effective light entry face and passes over, via a bend, into the light passage section for imaging the bend as a bright-dark-boundary by means of light coupled or irradiated into the light entry face, wherein at least one segment (in particular a segment being no central segment and/or in particular a segment through which the optical axis of the light passage section or the headlight lens does not extend, and/or in particular a segment through which the z-axis or the z-direction does not extend, and/or in particular a marginal segment and/or in particular a non-centred segment, in particular a non-central segment) of the optically effective light exit face is (essentially) defined by a function (distance function, distance function from the y-coordinate/y-axis, parametrising function)

$$r(\Phi, y) = f(\Phi) - \frac{f(\Phi)(n-1)n - \sqrt{n^2(n-1)(f(\Phi)^2(n-1)-(n+1)y^2)}}{n^2-1}$$

(or is limited by this function with its parameter variations, i.e. is in particular located in a corridor which is determined or defined or limited by this function (with its parameter variations), wherein Φ is an angle (starting from a z-coordinate) or a polar coordinate (starting from a z-coordinate ($\Phi=0$ in the z-direction)) in a plane defined by a/the z-coordinate and an x-coordinate, wherein z is a coordinate in the direction of one or the optical axis of the light tunnel and/or in the longitudinal direction of the light tunnel and/or headlight lens and/or the light passage section and/or a segment of the light exit face and/or the light exit face, y is a coordinate in the vertical direction and/or an axis of rotation, and x is a coordinate orthogonal to the y-direction and orthogonal to the z-direction and/or in the horizontal direction, wherein n is the index of refraction or the refractive index of the transparent material, and wherein $f(\Phi)$ is equal to $r(\Phi, y=0)$ with $$r(\phi, y=0) = \frac{N}{Y(\phi - \phi_0)^X + \cos(\phi) + m \cdot \sin(\phi)}$$

wherein $\Phi_0$ is a point of intersection of two segments of the optically effective light exit face at y=0, and wherein 55 mm≤N≤65 mm and/or
0.2≤m≤0.3 and/or
1.0≤X≤4.0 and/or
1.0<X≤4.0 and/or
1.1≤X≤4.0 and/or
1.2≤X≤4.0 and/or
1.5≤X≤4.0 and/or
0<Y≤1 and/or
0.1≤Y≤1

One segment of a light exit face in the sense of the present disclosure is in particular separated from another or further segment of the light exit face by means of a notch or a bend.

In an advantageous embodiment of the present disclosure, it is intended that $\Phi_0$ is not smaller than 5° and/or not larger than 20°. In a further advantageous embodiment of the present disclosure, it is intended that $\Phi_0$ is not larger than 15°. In a further advantageous embodiment of the present disclosure, it is intended that $\Phi_0$ is not smaller than 9° and/or not larger than 11°.

In a further advantageous embodiment of the present disclosure, it is intended that at least a portion of the surface limiting the light tunnel, in particular to the top, is part of an ellipsoid whose semiaxis is, in the horizontal direction orthogonal to the optical axis of the light tunnel or to the extension of the light tunnel in the longitudinal direction, in particular longer by at least 1.9 times, in particular at least three times, in particular not more than twenty times, than its semiaxis in the vertical direction, or is part of an ellipsoid $$E(x,z;y) = E_{a_1,b_1}(z;y) \times E_{a_2,b_2}(x;y)$$

wherein $E_{a_1,b_1}(z;y)$ and $E_{a_2,b_2}(x;y)$ are two crossed ellipses, wherein z is a coordinate in the direction of the optical axis of the light tunnel and/or in the longitudinal direction of the light tunnel, wherein y is a coordinate in the vertical direction, wherein x is a coordinate orthogonal to the y-direction and orthogonal to the z-direction, wherein $$E_{a_1,b_1}(z;y): \frac{z^2}{a_1^2} + \frac{y^2}{b_1^2} = 1$$

$$E_{a_2,b_2}(x;y): \frac{x^2}{a_2^2} + \frac{y^2}{b_2^2} = 1$$

wherein:
1.9·$b_1$≤$a_2$ and/or
3·$b_1$≤$a_2$ and/or
0<$a_1$/$a_2$≤1.5 or 0≤$a_1$/$a_2$≤1.5 and/or
$a_2$≤20·$b_1$ and/or
$a_2$≤50·$b_1$ and/or In an advantageous embodiment of the present disclosure, one or the right side face of the light tunnel and/or one or the left side face of the light tunnel is (at least partially) concavely curved.

In one embodiment of the present disclosure, one or the right and/or one or the left side face of the light tunnel is curved (at least partially) corresponding to a Bézier curve. In a further advantageous embodiment of the present disclosure, the following applies:

0.3·$d_1$≤$s_1$≤0.7·$d_1$ and/or
0.4·$d_2$≤$s_2$≤1.5·$d_2$ and/or
1.5≤$d_1$/$d_2$≤10 and/or
0.3≤g≤0.7, if
the starting point of the Bézier curve has the coordinates 0,0,
the end point of the Bézier curve has the coordinates $d_1$,$d_2$,
the or one control point of the Bézier curve has the coordinates $s_1$,$s_2$, and/or
the or one control point of the Bézier curve has the weighting g.

In an advantageous embodiment, one or the right side face of the light tunnel and/or one or the left side face of the light tunnel is strictly concavely curved in the direction of a coordinate line. This coordinate line in one embodiment is curve that results if the side face intersects a horizontal plane and/or a plane comprising the optical axis of the headlight lens and/or the x-z-plane. This curve will be designated with Γ below. It is here in particular intended that the radius of curvature of Γ is not smaller than 20 mm and/or not larger than 200 mm. It is in particular intended that the overall arc length Γ is not shorter than 10 mm and/or not longer than 40 mm. In a further advantageous embodiment of the present disclosure, Γ starts at the edge of the light entry face with a starting direction that is inclined with respect to the optical axis of the headlight lens (within the horizontal plane and/or within the plane comprising the optical axis of the headlight lens and/or within the x-z-plane) by an angle that is larger than 0 and/or not larger than 15°.

In a further advantageous embodiment of the present disclosure, the light tunnel is funnel-shaped, tapering towards the light entry face. In a further advantageous embodiment of the present disclosure, the right and left side faces of the light tunnel form part of a funnel tapering towards the light entry face. In one embodiment of the present disclosure, the left side face of the light tunnel is not symmetric to the right side face of the light tunnel. In one embodiment of the present disclosure, the left side face of the light tunnel is inclined with respect to the optical axis of the light tunnel. In one embodiment of the present disclosure, the right side face of the light tunnel is inclined with respect to the optical axis of the light tunnel.

In a further advantageous embodiment of the present disclosure, one surface of the light passage section, or the surface facing the light tunnel, comprises (at least in the region where it passes over into the light tunnel) a Petzval face region which is designed in the shape of an M and/or which comprises a first Petzval face and a second Petzval face different from the first Petzval face.

In a further advantageous embodiment of the present disclosure, the transition between the first Petzval face and the second Petzval face is continuous.

In a further advantageous embodiment of the present disclosure, the Petzval face region comprises at least one third Petzval face. In a further advantageous embodiment of the present disclosure, the transition between the first Petzval face and the third Petzval face is continuous. In a further advantageous embodiment of the present disclosure, the first Petzval face is disposed between the second Petzval face and the third Petzval face. In a further advantageous embodiment of the present disclosure, the first Petzval face is concavely curved. It is advantageously provided that the radius of curvature (or the quantity thereof) of the second Petzval face and/or the third Petzval face is not smaller than 15 mm. In a further advantageous embodiment of the present disclosure, one Petzval face is assigned to one segment of the light exit face. In a further advantageous embodiment of the present disclosure, one (different) Petzval face is assigned to each segment of the light exit face. In a further advantageous embodiment of the present disclosure, the Petzval face region comprises a plurality of Petzval faces, wherein it is in particular intended that one (different) Petzval face is assigned to each segment of the light exit face. In a further advantageous embodiment of the present disclosure, the transition between adjacent Petzval faces is continuous.

In a further advantageous embodiment of the present disclosure, the bend extends (in its longitudinal direction) following an M-shaped trajectory. In a further advantageous embodiment of the present disclosure, the bend has a region in which it extends following (in its longitudinal direction) an M-shaped trajectory.

An optically effective light entry face or an optically effective light exit face is an optically effective surface of the monolithic body. An optically effective surface in the sense of the present disclosure is in particular a surface of the transparent body where refraction of light occurs when the headlight lens is used according to its purpose. An optically effective surface in the sense of the present disclosure is in particular a surface where the direction of light passing through this surface is (purposefully) changed when the headlight lens is used according to its purpose.

A transparent material in the sense of the present disclosure is in particular glass. A transparent material in the sense of the present disclosure is in particular inorganic glass. A transparent material in the sense of the present disclosure is in particular silicate glass. A transparent material in the sense of the present disclosure is in particular glass as it is described in PCT/EP2008/010136. Glass in the sense of the present disclosure in particular comprises 0.2 to 2 weight percent of $Al_2O_3$,
0.1 to 1 weight percent of $Li_2O$,
0.3, in particular 0.4 to 1.5 weight percent of $Sb_2O_3$,
60 to 75 weight percent of $SiO_2$,
3 to 12 weight percent of $Na_2O$,
3 to 12 weight percent of $K_2O$ and
3 to 12 weight percent of CaO.

Press-molded in particular means, in the sense of the present disclosure, to press an optically effective surface in such a way that a subsequent finishing of the contour of this optically effective surface may be omitted or is omitted or not intended at all. It is thus in particular intended that a press-molded surface is not polished after press-molding.

A light tunnel in the sense of the present disclosure is in particular characterized in that total reflection essentially takes place at its lateral (in particular top, bottom, right and/or left) surfaces, so that light entering through the light entry face is guided through the tunnel as a light guide. A light tunnel in the sense of the present disclosure is in particular a light guide. It is in particular intended that total reflection occurs at the long sides of the surfaces of the light tunnel. It is in particular intended that the long sides of the surfaces of the light tunnel are provided for total reflection. It is in particular intended that total reflection occurs at the surfaces of the light tunnel essentially oriented in the direction of the optical axis of the light tunnel. It is in particular intended that the surfaces of the light tunnel essentially oriented in the direction of the optical axis of the light tunnel are provided for total reflection. In an advantageous embodiment, it is intended that the light tunnel, in particular the region of the bend, has no reflective coating.

A bend in the sense of the present disclosure is in particular a curved transition. A bend in the sense of the present disclosure is in particular a transition curved with a radius of curvature of not less than 50 nm. It is in particular intended that the surface of the headlight lens does not comprise any discontinuity in the bend but a curvature. It is in particular intended that the surface of the headlight lens comprises, in the bend, a curvature, in particular having a radius of curvature in the bend of not less than 50 nm. In an advantageous embodiment, the radius of curvature is not larger than 5 mm. In an advantageous embodiment, the radius of curvature is not larger than 0.25 mm, in particular not larger than 0.15 mm, advantageously not larger than 0.1 mm. In a further advantageous embodiment of the present disclosure, the radius of curvature in the bend is at least 0.05 mm. It is in particular intended that the surface of the headlight lens is press-molded in the region of the bend.

In a further advantageous embodiment of the present disclosure, the orthogonal of the light entry face is inclined with respect to the optical axis of the light passage section, in particular at an angle between 85° and 20°, for example at an angle between 70° and 40°.

In a further advantageous embodiment of the present disclosure, the bend is curved in a first direction and in a second direction. In a further advantageous embodiment of the present disclosure, the first direction is orthogonal to the second direction.

In a further advantageous embodiment of the present disclosure, the length of the headlight lens is, in the orientation of the optical axis of the light tunnel and/or the light passage section, not more than 9 cm.

The above mentioned object is moreover achieved by a vehicle headlight, in particular a motor vehicle headlight, wherein the vehicle headlight comprises a headlight lens—in particular including one or several ones of the above mentioned features—as well as a light source for coupling light into the light entry face. In an advantageous embodiment of the present disclosure, the light source comprises at least one LED or an arrangement of LEDs. In an advantageous embodiment of the present disclosure, the light source comprises at least one OLED or an arrangement of OLEDs.

The light source may also be, for example, an extended illuminated field. The light source may also comprise light element chips as disclosed in DE 103 15 131 A1. A light source may also be a laser. A laser that can be used is disclosed in ISAL 2011 Proceedings, page 271 pp.

In a further advantageous embodiment of the present disclosure, the ellipsoid comprises a first focal point and a second focal point, wherein the light entry face optionally extends or is oriented
- (essentially) vertically and/or
- (essentially) orthogonally to the optical axis of the headlight lens
- (essentially) orthogonally to the optical axis of the light tunnel
- (essentially) orthogonally to the longitudinal axis of the light tunnel
- (essentially) orthogonally to the optical axis of the light passage section
- (essentially) orthogonally to the optical axis of the light exit face and wherein the light source is (completely) arranged (in the light path) between the first focal point and the second focal point. In a further advantageous embodiment of the present disclosure, the distance of the light source from the first focal point is τ·d (in a direction of a/the orthogonal of the light entry face and/or in the direction of a straight line through the first focal point and the second focal point), wherein d is the distance of the first focal point from the second focal point, and wherein τ is greater 0 and smaller than or equal to 0.1. In a further advantageous embodiment of the present disclosure, τ is greater than or equal to 0.025 and smaller than or equal to 0.1. In a further advantageous embodiment of the present disclosure, τ is greater than or equal to 0.05 and smaller than or equal to 0.1.

In a further advantageous embodiment of the present disclosure, the vehicle headlight comprises no secondary optical system assigned to the headlight lens. A secondary optical system in the sense of the present disclosure is in particular an optical system for orienting light exiting from the light exit face or the last light exit face of the headlight lens. A secondary optical system in the sense of the present disclosure is in particular an optical element for orienting light which is separate from the headlight lens and/or disposed downstream thereof. A secondary optical system in the sense of the present disclosure is in particular no covering or protecting disk, but an optical element provided for orienting light. One example of a secondary optical system is, for example, a secondary lens as it is disclosed in DE 10 2004 043 706 A1.

It is in particular intended that the bend that is imaged as bright-dark-boundary lies in the lower region of the light tunnel.

In a further advantageous embodiment of the present disclosure, the distance of the light source from the centre of the light exit face in the orientation of the optical axis of the light tunnel and/or the light passage section is not more than 12 cm. In a further advantageous embodiment of the present disclosure, the length of the vehicle headlight (restricted to the light source and the headlight lens) in the orientation of the optical axis of the light tunnel and/or the light passage section is not more than 12 cm.

One or several further light sources may be provided of which the light is coupled or irradiated into the passage section and/or a portion of the light tunnel for implementing sign light, high beam and/or corner light. When such additional light is coupled into the light tunnel, it is in particular intended that this is done in that half of the light tunnel that is closer to the light passage section and/or in which the light entry face is not provided.

One or several further light sources may be provided of which the light is coupled or irradiated into the passage section and/or a portion of the light tunnel for implementing sign light, high beam and/or corner light. When such additional light is coupled into the light tunnel, it is in particular intended that this is done in that half of the light tunnel that is closer to the light passage section and/or in which the light entry face is not provided. In particular, additional light source arrangements may be provided as described or claimed in WO 2012/072192 A1. Additional light source arrangements are in particular described in FIGS. 10, 14, 15, 18, 19, 20 and 21 of WO 2012/072192 A1. The headlight lens according to the present disclosure may in particular also be used in arrays with optical axes that are inclined with respect to each other, as is disclosed (or claimed), for example, in WO 2012/072193 A2, in particular in FIG. 24 of WO 2012/072193 A2. In addition or as an alternative, it may be provided that the headlight lens according to the present disclosure is employed in vehicle configurations as disclosed or claimed in WO 2012/072191 A2.

In a further advantageous embodiment of the present disclosure, the light source and the (first) light entry face are designed and arranged with respect to each other in such a way that light of the light source enters the light entry face with a luminous flux density of at least 75 lm/mm².

The above mentioned headlight lenses may be manufactured by means of one of the methods described in WO 2012/072188 A1.

It may be intended that a light entry face in the sense of the present disclosure and/or a light exit face in the sense of the present disclosure comprises a light scattering structure. A light scattering structure in the sense of the present disclosure may be e.-g. a structure as it is disclosed in DE 10 2005 009 556 A1 and EP 1 514 148 A1 or EP 1 514 148 B1. It may be intended that a light tunnel in the sense of the present disclosure is coated. It may be intended that a light tunnel in the sense of the present disclosure is coated with a reflective layer. It may be intended that a light tunnel in the sense of the present disclosure is mirrored.

One side face of a light tunnel in the sense of the present disclosure is in particular a surface laterally limiting the light tunnel.

A segment of the light exit face is considered, in the sense of the present disclosure, as being assigned to a Petzval face in particular if the segment images that portion of the bend which forms the transition from the light tunnel into this Petzval face. A segment is considered, in the sense of the present disclosure, as being assigned to a Petzval face or a region in particular if the essential portion of the light entering from the light tunnel into the light passage section in said region or through the Petzval face or in the region of the Petzval face exits from this segment. An essential portion in this sense in particular comprises 80%, in particular 90%, in particular 95%.

A motor vehicle in the sense of the present disclosure is in particular a land craft to be individually used in road traffic. Motor vehicles in the sense of the present disclosure are in particular not restricted to land crafts with an internal combustion engine.

Figure 2:
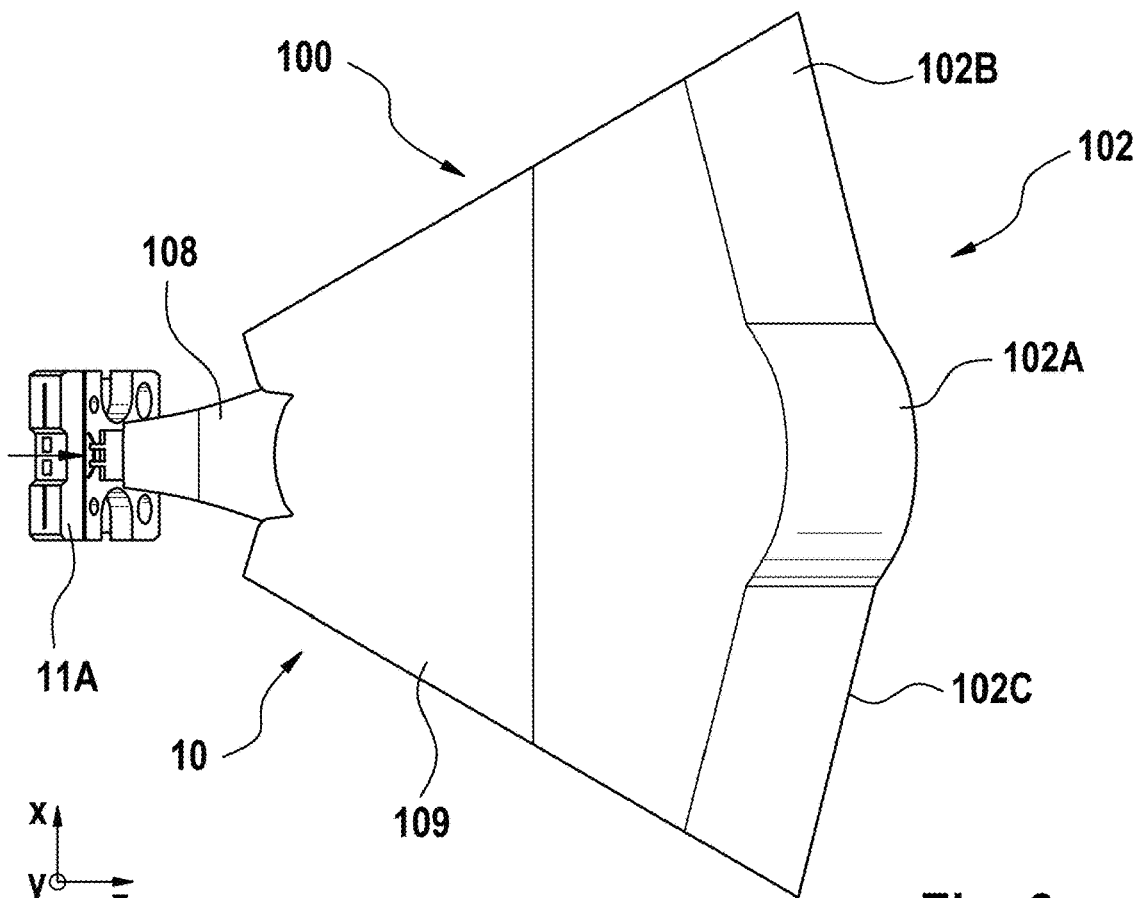
Figure 3:
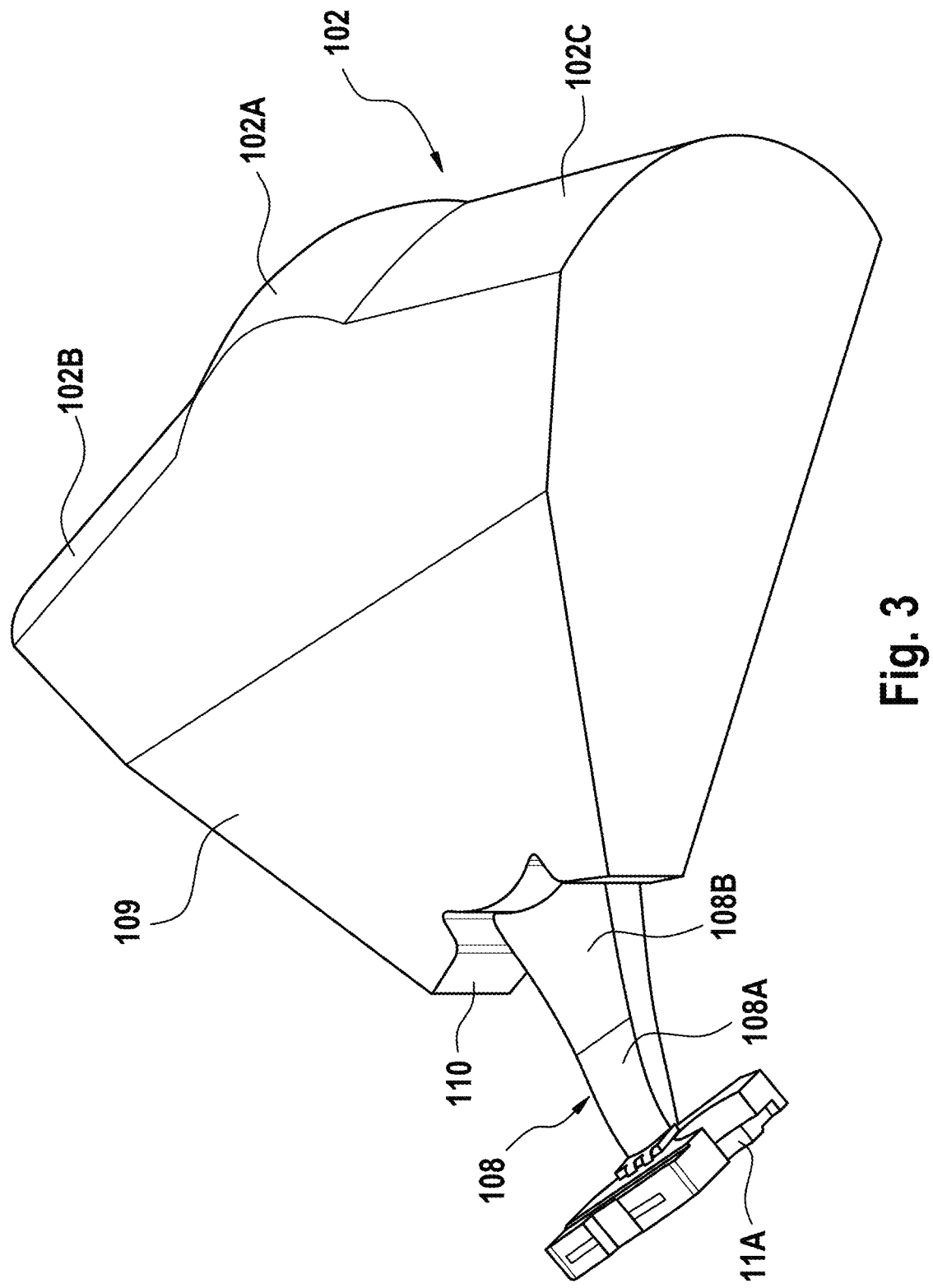
Figure 4:
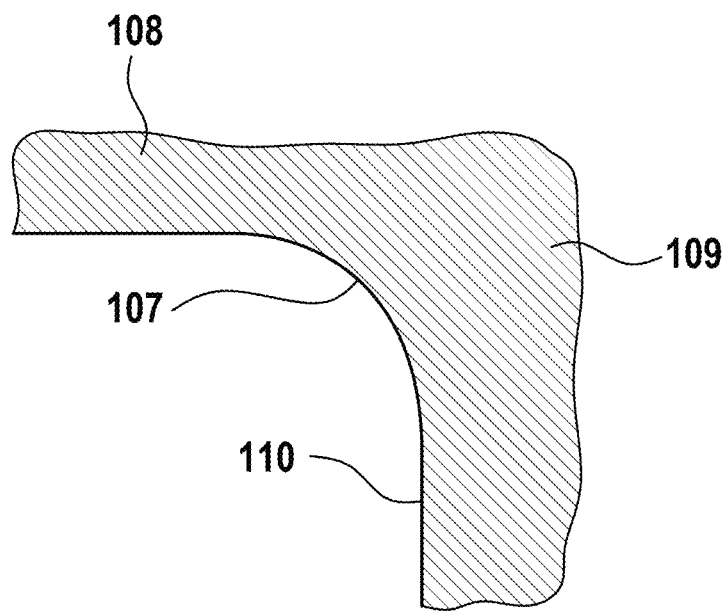
Figure 5:
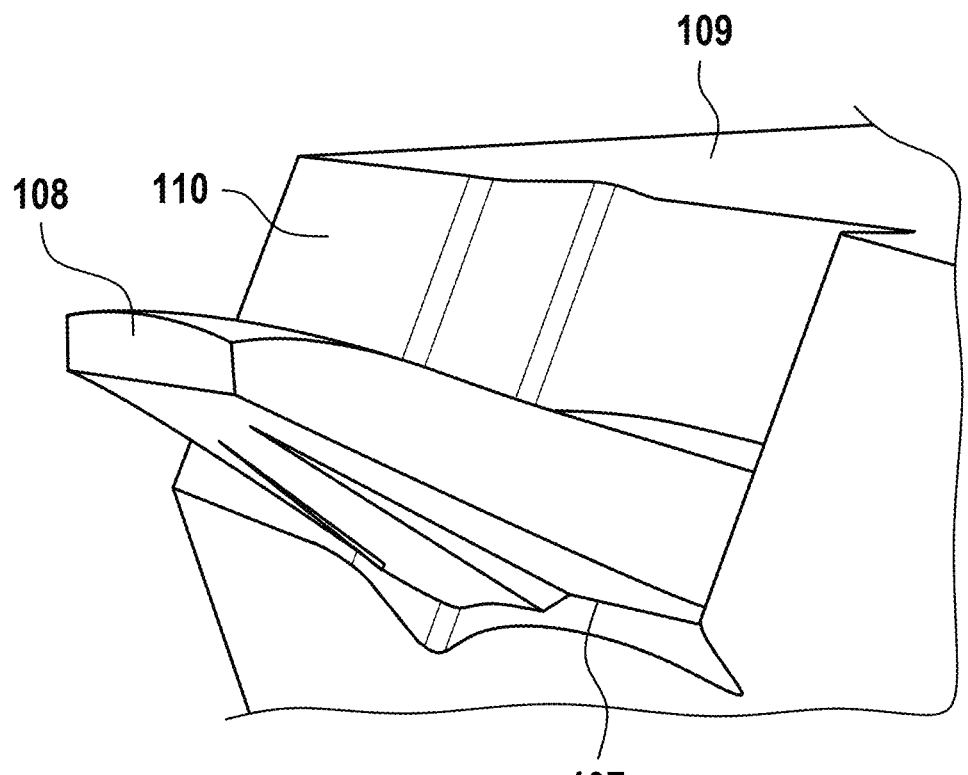
Figure 6:
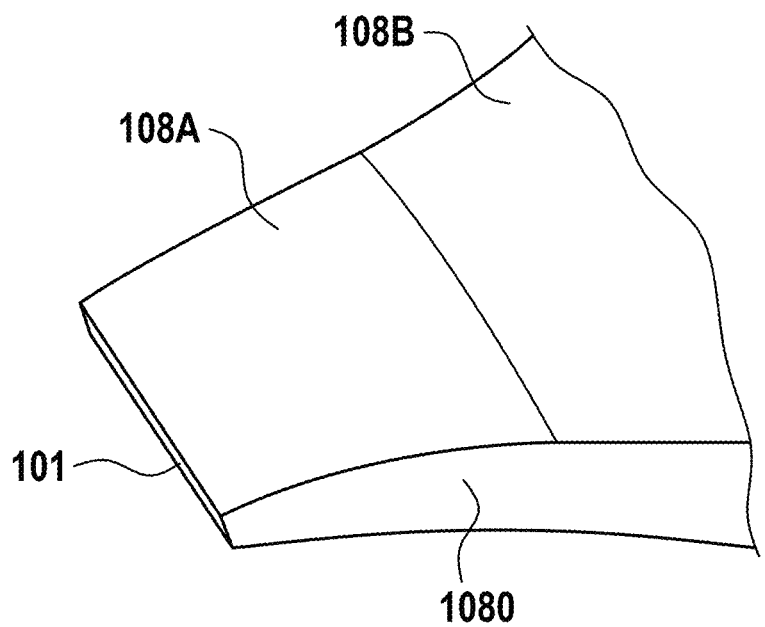
Figure 7:
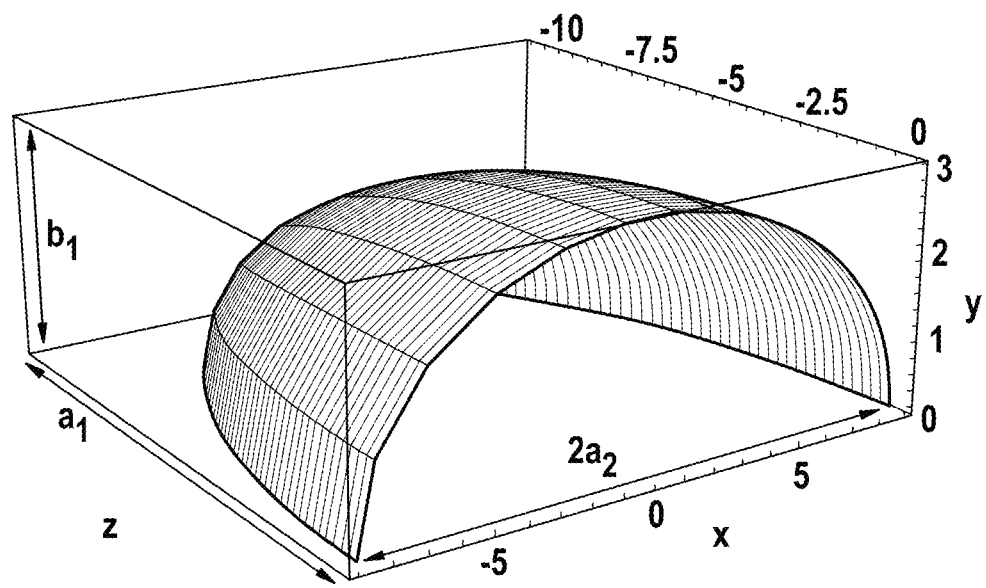
Figure 8:
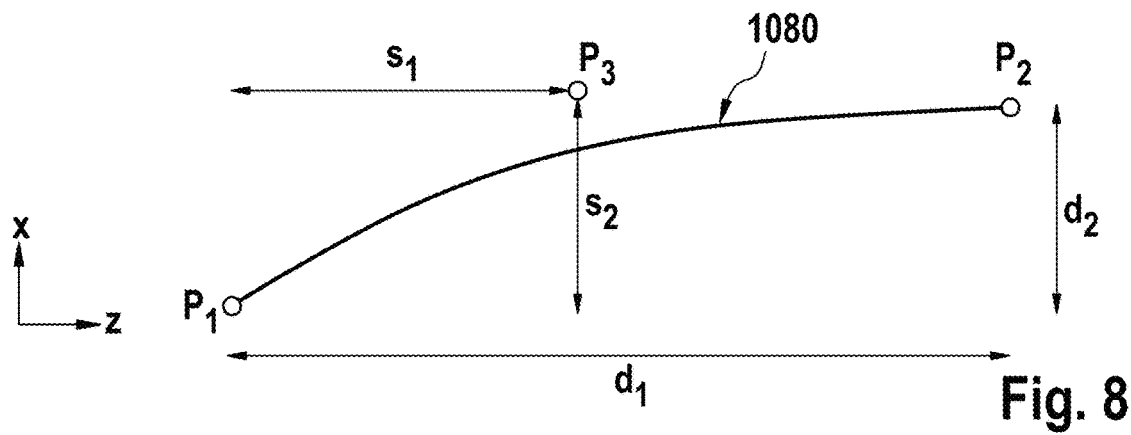
Figure 9:
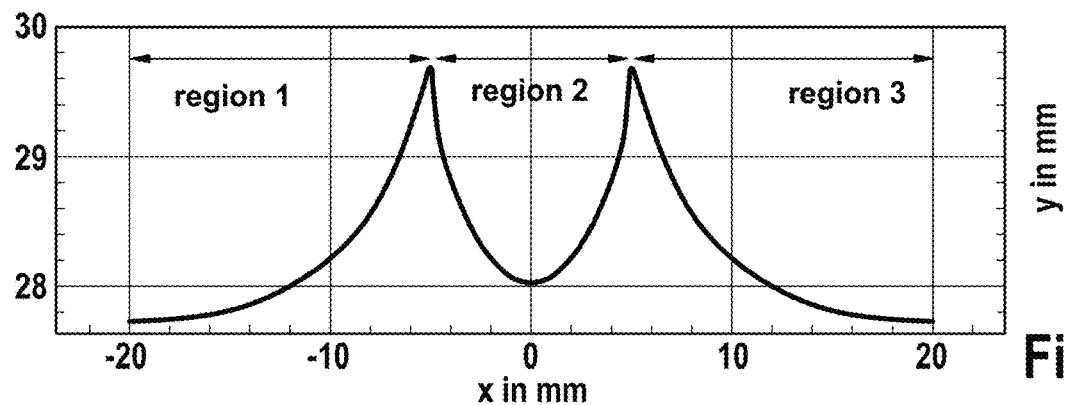
Figure 10:
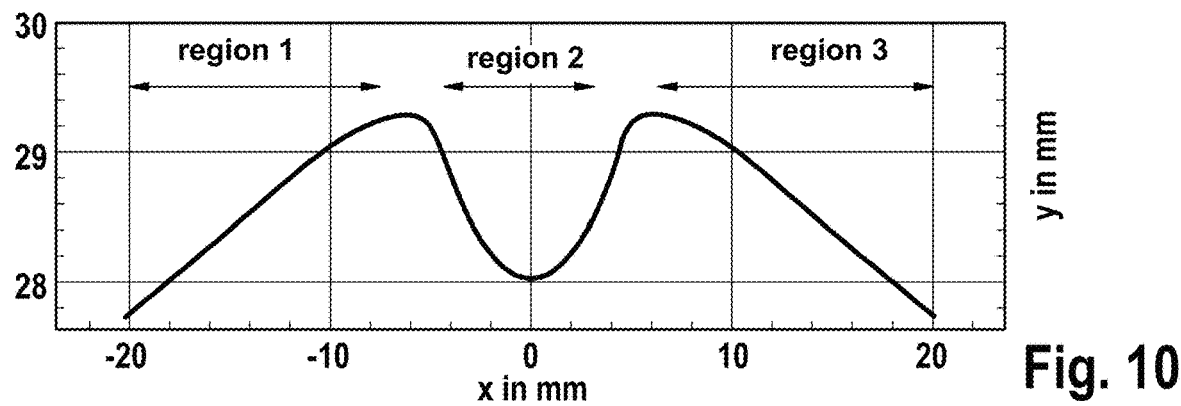
Figure 11:
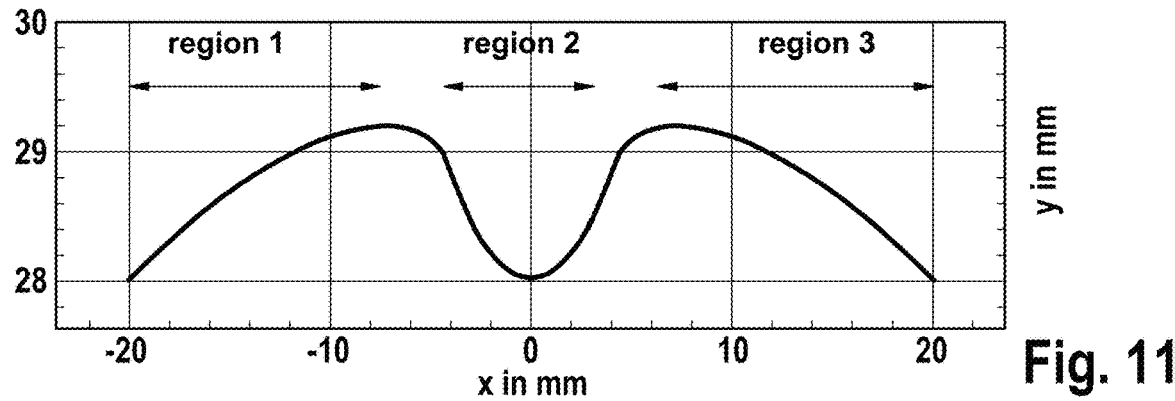
Figure 12:
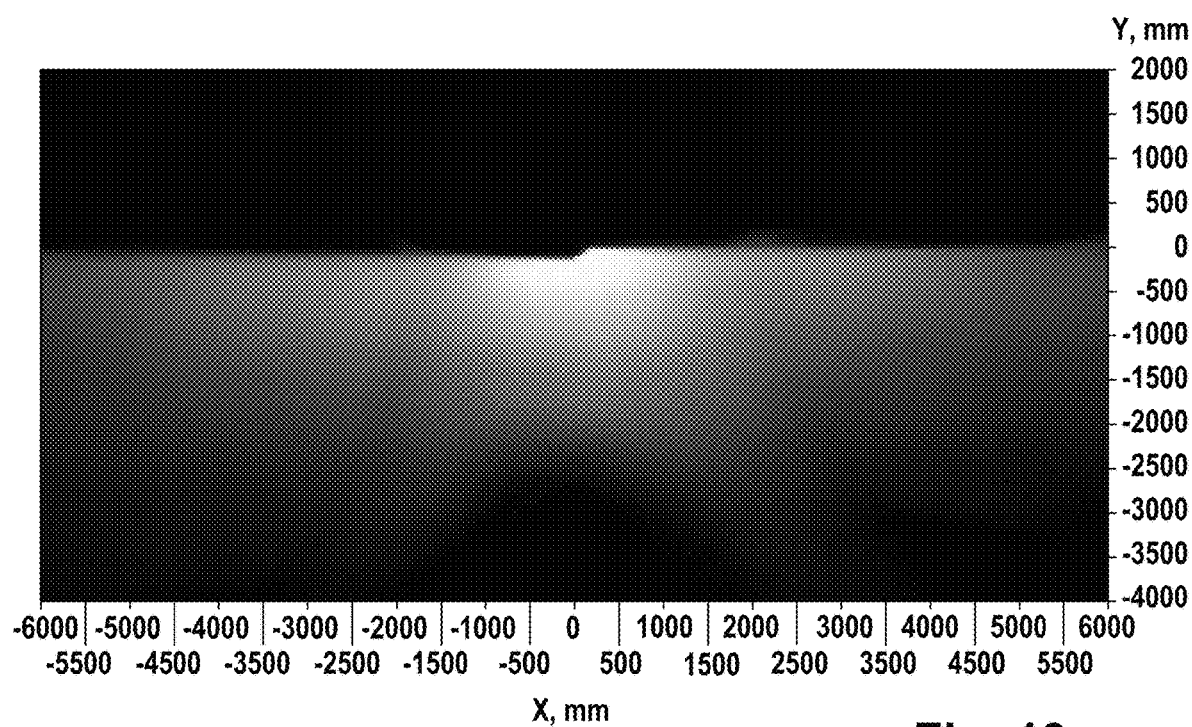
Figure 13:
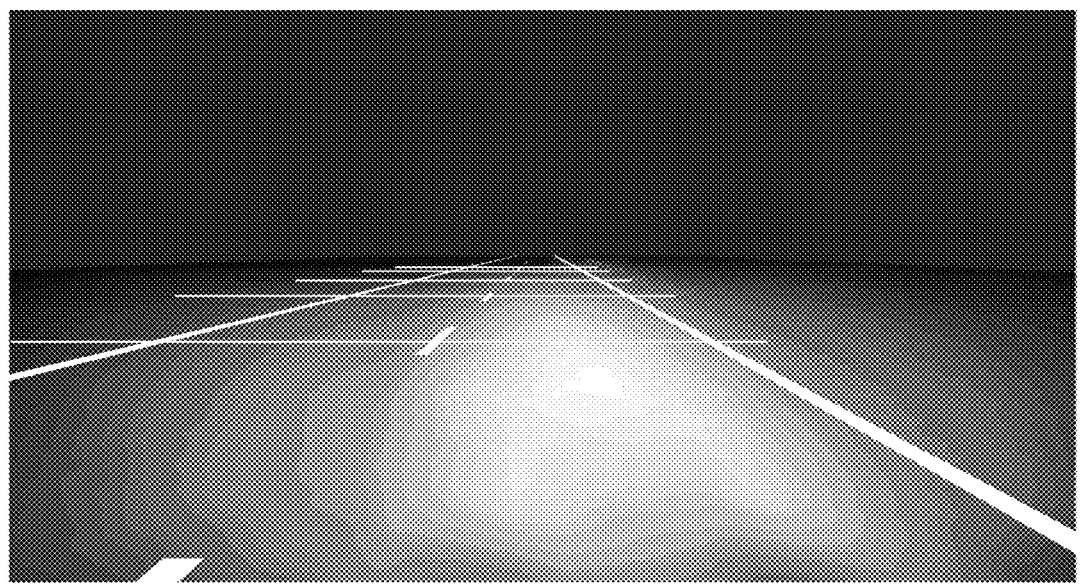
Figure 14:
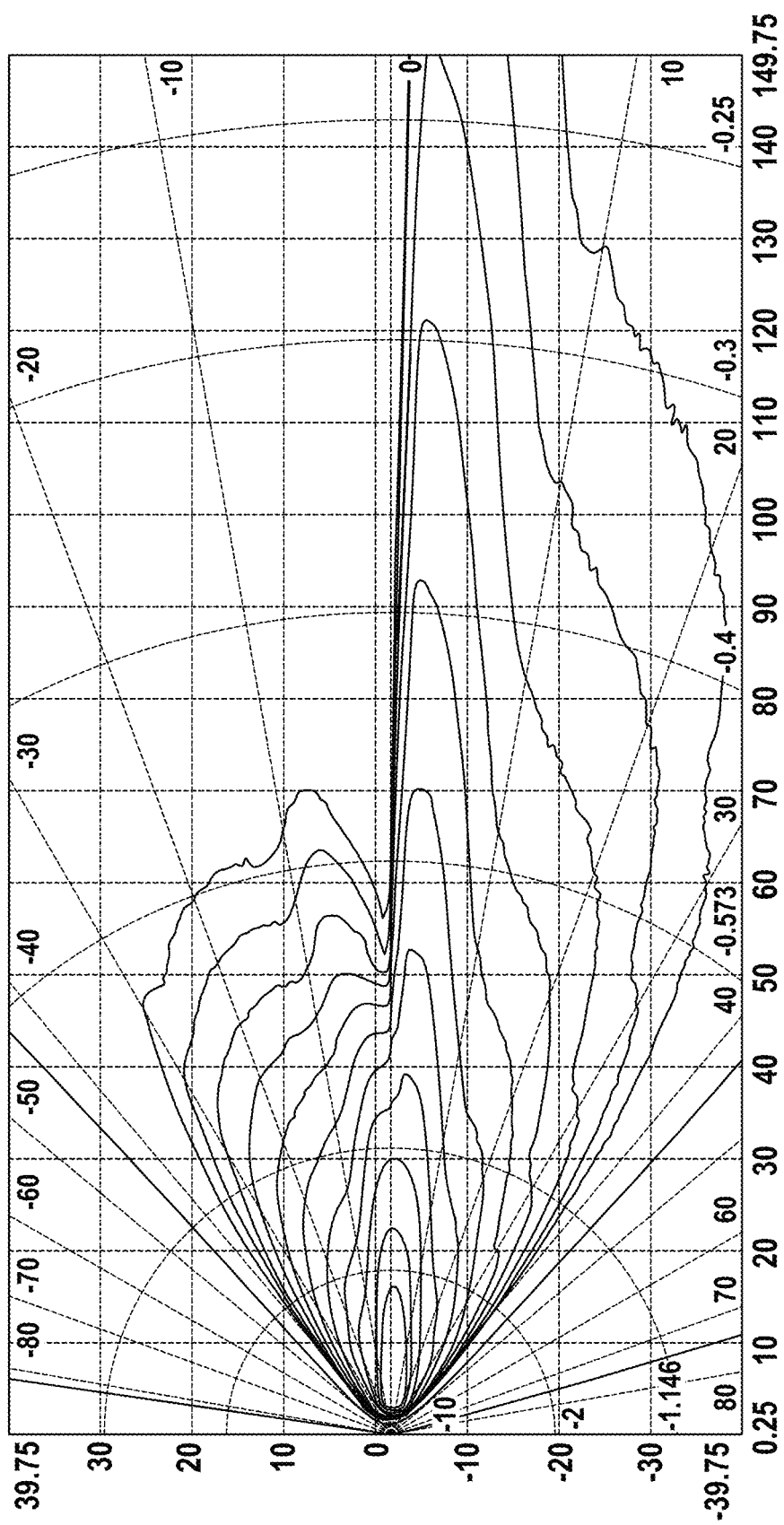
Figure 15:
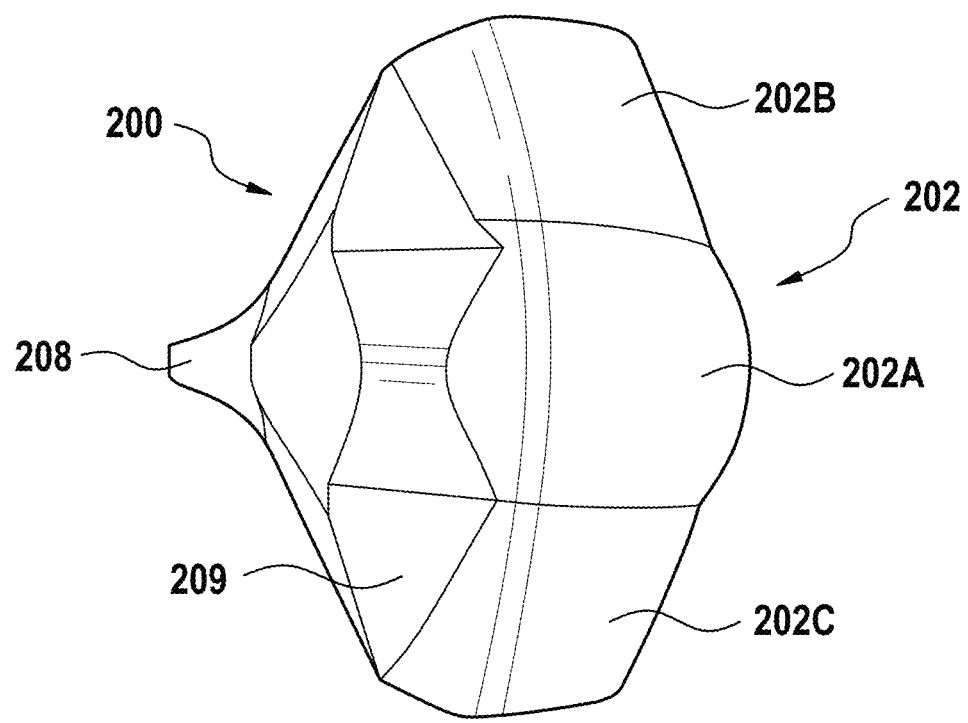
Figure 16:
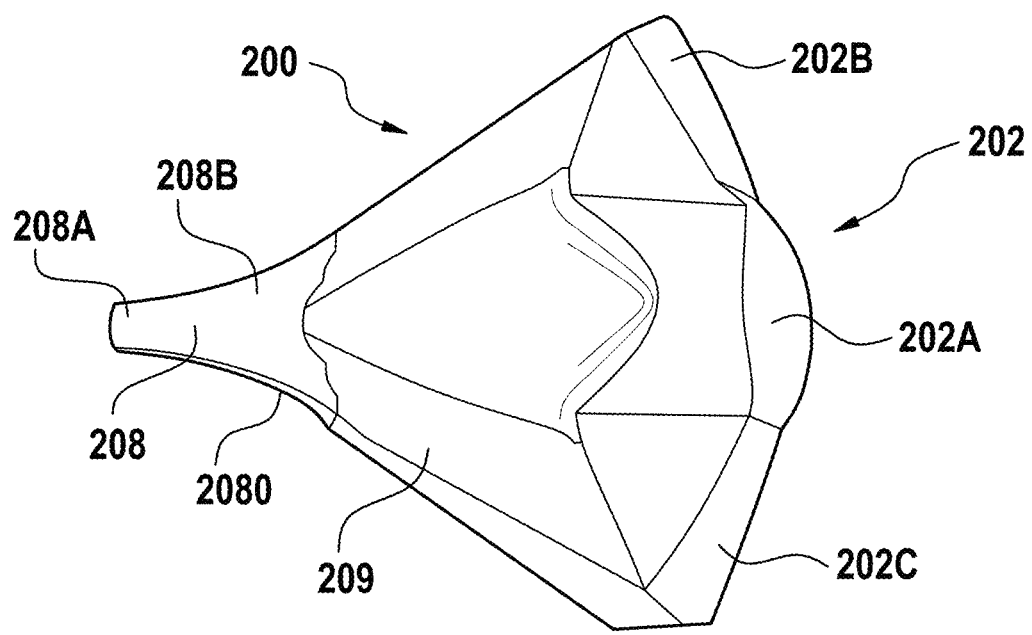
Figure 17:
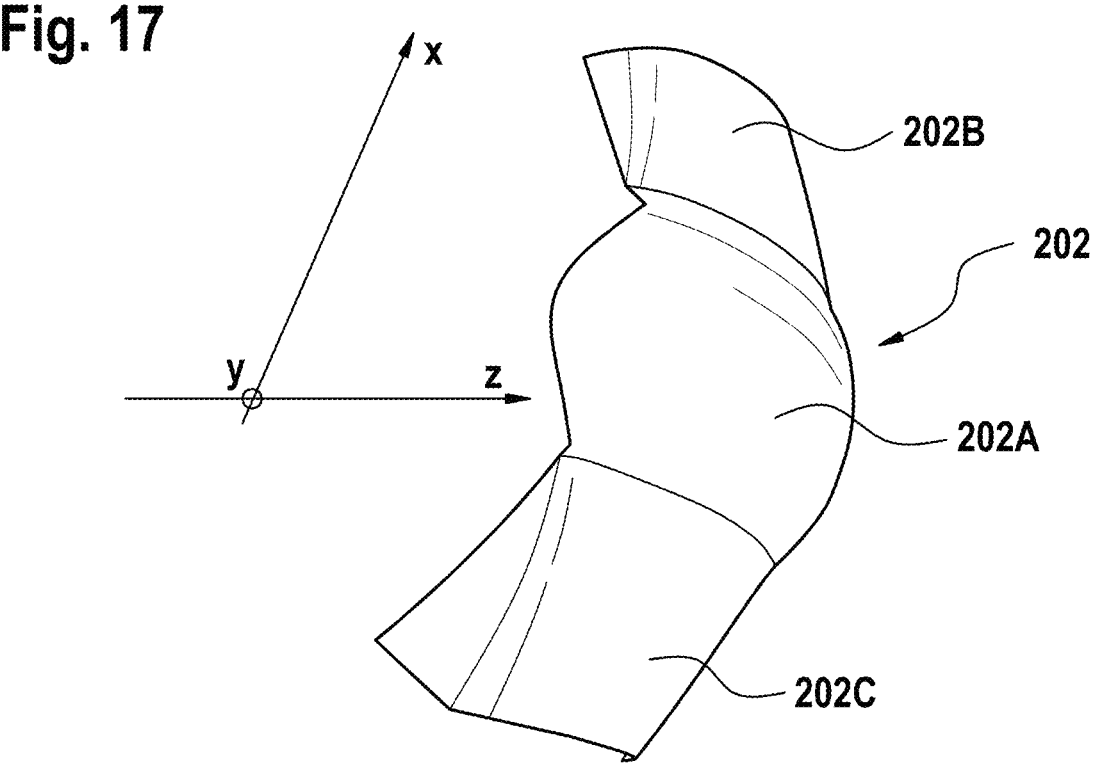
Figure 18:
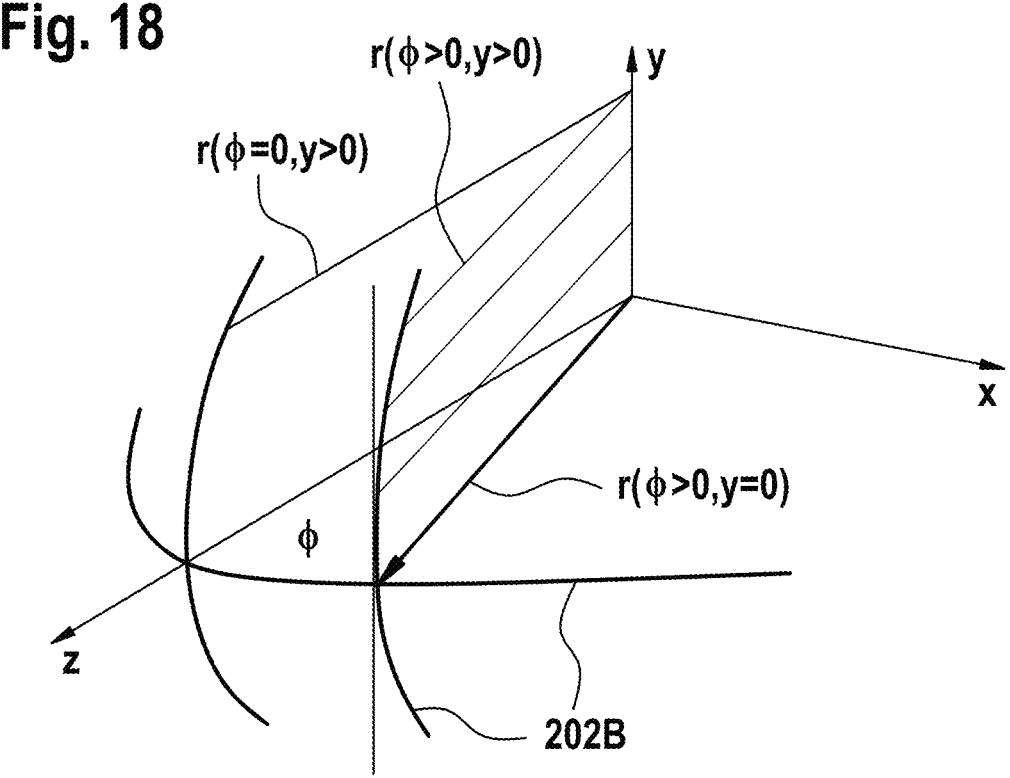
Figure 19:
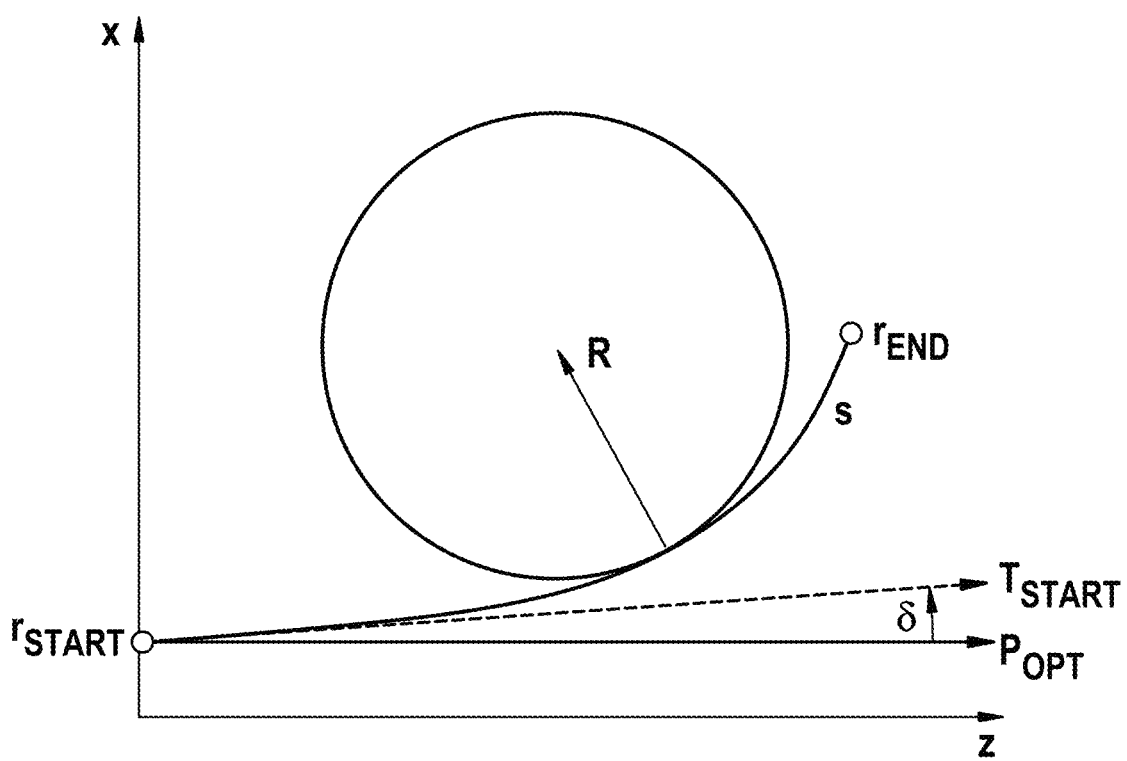

Further advantages and details result from the following description of exemplified embodiments. In the drawing:

FIG. 1 shows an exemplified embodiment of a motor vehicle,

FIG. 2 shows an exemplified embodiment of a motor vehicle headlight to be used in the motor vehicle according to FIG. 1 in a plan view, FIG. 3 shows the motor vehicle headlight according to FIG. 2 in a perspective side view, FIG. 4 shows an enlarged cross-section of a bend for the transition of a light tunnel into a light passage section of a headlight lens according to FIG. 3 in sections, FIG. 5 shows an enlarged representation of the transition between the light tunnel and the light passage section of the headlight lens according to FIG. 3, FIG. 6 shows a representation of the light tunnel of the headlight lens according to FIG. 3 in sections, FIG. 7 shows a flattened ellipsoid according to the upper part of which the surface of the light tunnel of the headlight lens forming a limitation to the top is designed according to FIG. 3, FIG. 8 shows an exemplified embodiment of a Bézier curve describing a concave curvature of the side walls of the light tunnel of the headlight lens according to FIG. 3, FIG. 9 shows the course of the bend in the transition between the light tunnel and the light passage section, wherein the course of the bend is represented in its longitudinal direction, FIG. 10 shows an alternative exemplified embodiment of the course of the bend in its longitudinal direction, FIG. 11 shows a further alternative exemplified embodiment of a course of the bend in its longitudinal direction, FIG. 12 shows a bright-dark-boundary generated by means of the headlight lens according to FIG. 3, FIG. 13 shows the illumination of a roadway by means of a headlight according to FIG. 3 as seen by a driver, FIG. 14 shows the illumination of a roadway by means of a headlight according to FIG. 3 in a plan view, FIG. 15 shows an exemplified embodiment of an alternative headlight lens to be used in the vehicle headlight according to FIG. 3 in a perspective representation, FIG. 16 shows the headlight lens according to FIG. 15 in a further perspective representation, FIG. 17 shows the light exit face of the headlight lens according to FIG. 15 in a perspective representation, FIG. 18 shows an exemplified embodiment for illustrating (the parameters of) the function (distance function, distance function from the y-coordinate/y-axis) of an optically effective light exit face of the headlight lens according to FIG. 3 and/or according to FIG. 15, and FIG. 19 shows an exemplified embodiment of a function alternative to FIG. 8 describing a concave curvature of the side walls of the light tunnel of the headlight lens according to FIG. 3.

FIG. 1 shows an exemplified embodiment of a motor vehicle 1 having a motor vehicle headlight 10. FIG. 2 shows the motor vehicle headlight 10 in a plan view with a headlight lens 100, however without housing, mountings and energy supply, wherein the headlight lens 100 is shown in FIG. 3 in a perspective side view, however neither with housing, mountings and energy supply. The headlight lens 100 comprises a press-molded monolithic body of inorganic glass, in particular glass comprising 0.2 to 2 weight percent of $Al_2O_3$,
    0.1 to 1 weight percent of $Li_2O$,
    0.3, in particular 0.4 to 1.5 weight percent of $Sb_2O_3$,
    60 to 75 weight percent of $SiO_2$,
    3 to 12 weight percent of $Na_2O$,
    3 to 12 weight percent of $K_2O$, and
    3 to 12 weight percent of $CaO$.

The press-molded monolithic body comprises a light tunnel 108 shown in FIG. 6 in a detailed representation in sections, the light tunnel 108 comprising on one side a light entry face 101 and passing on another side with a bend 107, represented in FIG. 4 in an enlarged view, into a light passage section 109 (of the press-molded monolithic body) comprising a segmented light exit face 102 whose segments are designated with reference numerals 102A, 102B, 102C. The headlight lens 100 is designed such that light entering through the light entry face 101 into the headlight lens 100 and entering, in the region of the bend 107, from the light tunnel 108 into the light passage section exits from the light exit face 102 essentially in parallel to the optical axis of the headlight lens 100. The bend 107 is formed by press-molding and is designed as continuously curved transition. The light passage section 109 (or the light exit face 102) images the bend 107 as a bright-dark-boundary, as is illustrated in FIG. 12, wherein, by means of a light source arranged on a support 11A and designed as an LED for implementing a low beam, light is irradiated or coupled into the light entry face 101 of the light tunnel 108. The light tunnel 108 has a transition region 108B in which the surface limiting the light tunnel 108 to the top rises towards the light passage section 109 and in which the surface limiting the light tunnel 108 to the bottom extends approximately horizontally or in parallel to the optical axis of the headlight lens 100. The motor vehicle headlight 10 can be supplemented with further light sources as disclosed in WO 2012/072188 A1 and WO 2012/072192 A1. For example, by means of a light source, that may be switched on for a selective implementation of a sign light or a high beam, corresponding to the light source 12 disclosed in WO 2012/072188 A1, may be coupled or irradiated into a bottom side of the light tunnel 108 and/or into the surface of the light passage section 109 facing the light tunnel 108. The bend 107 is (formed by press-molding and) designed as continuous and/or curved transition.

The front part 108A of the light tunnel 108 is designed, as is represented in FIG. 6, on its surface limited to the top as part of an ellipsoid $$E(x,z;y) = E_{a_1,b_1}(z;y) \times E_{a_2,b_2}(x;y)$$

represented in FIG. 7, wherein $$E_{a_1,b_1}(z;y)$$

and $$E_{a_2,b_2}(x;y)$$

are two crossed ellipses (Here, the cross "x" means that an operation is performed separately in the x-direction and the y-direction and the representation of the ellipsoid comes apart into that of two planar ellipses), wherein z is a coordinate in the direction of the optical axis of the light tunnel and/or in the longitudinal direction of the light tunnel, wherein y is a coordinate in the vertical direction, wherein x is a coordinate orthogonal to the y-direction and orthogonal to the z-direction, and wherein $$E_{a_1,b_1}(z;y): \frac{z^2}{a_1^2} + \frac{y^2}{b_1^2} = 1$$

$$E_{a_2,b_2}(x;y): \frac{x^2}{a_2^2} + \frac{y^2}{b_2^2} = 1$$

Here, the following applies:

1.9·$b_1$≤$a_2$ and 1.9·$b_1$≤$a_2$ and/or

3·$b_1$≤$a_2$ and/or

0<$a_1$/$a_2$≤1.5 or 0≤$a_1$/$a_2$≤1.5 and/or $a_2$≤20·$b_1$ and/or $a_2$≤50·$b_1$ and/or The ellipsoid has a first focal point and a second focal point, wherein in one embodiment, the light source is (completely) arranged (in the light path) between the first focal point and the second focal point. In a further embodiment of the present disclosure, the distance of the light source from the first focal point is τ·d (in a direction of a/the orthogonal of the light entry face and/or in the direction of a straight line 101 through the first focal point and the second focal point), wherein d is the distance of the first focal point from the second focal point, and wherein τ is greater 0 and smaller than or equal to 0.1. In a further advantageous embodiment of the present disclosure, τ is greater than or equal to 0.025 and smaller than or equal to 0.1. In a further advantageous embodiment of the present disclosure, τ is greater than or equal to 0.05 and smaller than or equal to 0.1.

In the embodiment of the light tunnel 108 or the front portion 108A, represented in FIG. 6, $a_1$=11.4 mm, $a_2$=10 mm and $b_1$=3 mm.

The lateral surfaces 1080 of the light tunnel 108 form part of a funnel tapering in the direction towards the light entry face 101. Here, the lateral surfaces 1080 of the light tunnel 108 are concavely curved. Below, the lateral surfaces of the light tunnel 108 will also be referred to as side faces. Here, in an advantageous embodiment, the side faces 1080 of the light tunnel 108 are curved corresponding to a Bézier curve represented in FIG. 8. Here, the following designations apply $P_1$ is the starting point of the Bézier curve with the coordinates 0,0, $P_2$ is the end point of the Bézier curve with the coordinates $d_1$,$d_2$, $P_3$ is the control point of the Bézier curve with the coordinates $s_1$,$s_2$, and g is the weighting of the control point $P_3$.

In an advantageous embodiment, the following applies:

0.3·$d_1$≤$s_1$≤0.7·$d_1$ and/or 0.4·$d_2$≤$s_2$≤1.5·$d_2$ and/or 1.5≤$d_1$/$d_2$≤10 and/or 0.3≤g≤0.7.

FIG. 19 shows an alternative embodiment of the curved side faces or the lateral surfaces 1080 of the light tunnel 108, defined by the function Γ, taking the left curved side face or the left lateral surface as an example. The starting point of Γ is $r_{START}$(x>0, y=0, z=0, s=0), and the end point of Γ is $r_{END}$ (x≠0, y=0, z>0, s=L). The radius of curvature R of Γ is a function of the arc length s:

$$R=R(s)$$

with $$20\ mm \leq R(s) < 200\ mm$$

at an overall arc length L of $$10\ mm \leq L \leq 40\ mm$$

For the curvature K=1/R, the following applies (strictly concavely): K must not change the mathematical sign (and not become zero).

In FIG. 19, $P_{OPT}$ designates a parallel line to the optical axis of the headlight lens 100 or to the z-coordinate. $T_{start}$ designates the starting tangent of the arc length s which is inclined with respect to the parallel line to the optical axis of the headlight lens 100 or to the z-coordinate about an angle δ with $$0° < \delta \leq 15°$$

(positive δ means "left" of the optical axis).

The side 110 of the light passage section 109 facing to the light tunnel 108 has, as is shown in FIG. 5, a Petzval face region comprising three Petzval faces. The Petzval face region comprises, as is illustrated in FIG. 9, in one central region 2 one concave Petzval face. Adjacent to this central Petzval face is, each to the left and to the right in a region 1 and a region 3, one further Petzval face. The transitions between the Petzval faces are continuous, so that an M-shaped course results. In the present exemplified embodiments, the Petzval faces in the regions 1 and 3 are also concavely curved. In an alternative embodiment, as it is shown in FIG. 10, the Petzval faces in the regions 1 and 3 extend linearly. In a further exemplified embodiment, as is represented in FIG. 11, the Petzval faces in the regions 1 and 3 are convexly curved.

The Petzval face in the region 1 corresponds to (=is assigned to) the segment 102B of the light exit face 102, the Petzval face in the region 2 corresponds to (=is assigned to) the central segment 102A of the light exit face 102, and the Petzval face in the region 3 corresponds to (=is assigned to) the segment 102C of the light exit face 102. Here, it is intended that the essential portion of the light entering from the light tunnel 108 into the light passage section 109 in the region 1 exits from the segment 102B, that the essential portion of the light entering from the light tunnel 108 into the light passage section 109 in the region 2 exits from the segment 102A, and that the essential portion of the light entering from the light tunnel 108 into the light passage section 109 in the region 3 exits from the segment 102C.

FIG. 12 shows a bright-dark-boundary achieved by means of the vehicle headlight 10. FIG. 13 shows the illumination of a roadway as seen by the driver of a motor vehicle, and FIG. 14 shows the illumination of a roadway in a plan view. The representation of a bright-dark-boundary in FIG. 12 shows that by means of the vehicle headlight 10, a broad illumination is achieved, wherein there is nearly no color fringe at the bright-dark-boundary and where so-called "ears" are also avoided. The present disclosure thus permits the manufacture of a particularly inexpensive headlight lens for motor vehicles with a high quality of illumination.

FIG. 15 shows—in a perspective front view—an exemplified embodiment of a headlight lens 200 to be used as an alternative to the headlight lens 100. FIG. 16 shows the headlight lens 200 in a perspective plan view. The headlight lens 200 comprises, just as the headlight lens 100, a (press-molded) monolithic body of inorganic glass, in particular glass comprising 0.2 to 2 weight percent of $Al_2O_3$, 0.1 to 1 weight percent of $Li_2O$, 0.3, in particular 0.4 to 1.5 weight percent of $Sb_2O_3$, 60 to 75 weight percent of $SiO_2$, 3 to 12 weight percent of $Na_2O$, 3 to 12 weight percent of $K_2O$ and 3 to 12 weight percent of CaO The (press-molded) monolithic body comprises a light tunnel 208 comprising on the one side a light entry face corresponding to the light entry face 101, and passes over, on the other side, with a bend corresponding to the bend 107, into a light passage section 209 (of the monolithic body) which comprises a segmented light exit face 202 represented in FIG. 17 whose segments are designated with reference numerals 202A, 202B, 202C.

The headlight lens 200 is designed such that light entering through the light entry face into the headlight lens 200 and entering, in the region of the bend, from the light tunnel 208 into the light passage section, exits essentially in parallel to the optical axis of the headlight lens 200 from the light exit face 102. The bend is (formed by press-molding and) designed as (continuously) curved transition. The light passage section 209 forms the bend as bright-dark-boundary. The light tunnel 208 has a transition region 208B in which the surface limiting the light tunnel 208 to the top rises towards the light passage section 209 and in which the surface limiting the light tunnel 208 to the bottom extends approximately horizontally or in parallel to the optical axis of the headlight lens 200. The light tunnel 208 comprises a front part 208A which is designed corresponding to the front part 108A of the light tunnel 108.

The light exit faces (surfaces) of the segments 102B, 102C, 202B and 202C are defined or characterized as follows:

$$r(\Phi, y) = f(\Phi) - \frac{f(\Phi)(n-1)n - \sqrt{n^2(n-1)(f(\Phi)^2(n-1) - (n+1)y^2)}}{n^2 - 1}$$

Here, n is the index of refraction of the inorganic glass. $f(\Phi)$ is defined as $r(\Phi,y=0)$. The shape of the light exit faces or the surfaces of the segments 102B, 102C, 202B and 202C are moreover illustrated by FIG. 18, wherein the source is in the origin (0, 0, 0). Here, the following applies:

$$r(\phi, y=0) = \frac{N}{Y(\phi - \phi_0)^X + \cos(\phi) + m \cdot \sin(\phi)}$$

$\Phi_0$ describes the value at which the segments intersect. In the present exemplified embodiment, it is approximately 9° to 11°. Moreover, the following applies:

N∈[55 mm, 65 mm]
m∈[0.2, 0.3]
X∈[1.0, 4.0]
Y∈[0.1]

The following values are provided in the present exemplified embodiment:

N=62.2553 mm
m=0.284369
X=1.5
Y=0.3

The invention claimed is:

1. A vehicle headlight comprising a headlight lens, the headlight lens comprising:
    a light input section having at least one light entry face,
        a light tunnel extending from the light entry face in a direction defining an optical axis, and a transition portion with at least one transition surface located opposite the light entry face and curved in a plane parallel to the optical axis;
    a light passage section having an optically effective light exit face; wherein the light passage section is optically coupled to the transition portion such that the transition portion is imaged by the light passage section as a bright-dark boundary, and the light input section and the light passage section forming a monolithic body made of a transparent material, wherein at least a portion of an upper surface of the light tunnel is part of an ellipsoid whose major semiaxis extends in the lateral direction and with the minor semiaxis extending orthogonal to the optical axis and the lateral direction, the major semiaxis being longer than the minor semiaxis by at least 1.9 times.

2. The headlight of claim 1, a first side face of the light tunnel being at least partially curved corresponding to a first Bézier curve.

3. The headlight of claim 1, the major semiaxis being longer than the minor semiaxis by at least three times.

4. The headlight of claim 3, a first side face of the light tunnel being at least partially curved corresponding to a first Bézier curve.

5. The headlight of claim 4, a second side face of the light tunnel, opposite the first side face, being at least partially curved corresponding to a second Bézier curve.

6. A vehicle having a headlight, the headlight comprising a light source and a headlight lens of transparent material, the headlight lens comprising:
    at least one light entry face
    at least one optically effective light exit face,
    a light passage section,
    a light tunnel which, via a transition portion, transits into the light passage section configured for imaging the transition portion as a bright-dark-boundary, by means of light of the light source irradiated into the light entry face,
    wherein at least a portion of the upper surface of the light tunnel is part of an ellipsoid having first semiaxis in a horizontal direction and orthogonal to an extension of the light tunnel in a longitudinal direction and having a second semiaxis in a vertical direction, wherein the first semiaxis is longer than the second semiaxis by at least 1.9 times.

7. The vehicle of claim 6, a first side face of the light tunnel being at least partially concavely curved.

8. The vehicle of claim 6, the first semiaxis being longer than the second semiaxis by at least three times.

9. The vehicle of claim 8, the first semiaxis being longer than the second semiaxis by no more than twenty times.

10. The vehicle of claim 6, the first semiaxis being longer than the second semiaxis by no more than twenty times.

11. The vehicle of claim 10, a first side face of the light tunnel being at least partially curved corresponding to a first Bézier curve.

12. The vehicle of claim 11, a second side face of the light tunnel, opposite the first side face, being at least partially curved corresponding to a second Bézier curve.

13. A vehicle headlight lens, the headlight lens including a monolithic body of transparent material, the body comprising:
    at least one light entry face
    at least one optically effective light exit face,
    a light passage section,
    a light tunnel which, via a transition portion, transits into the light passage section configured for imaging the transition portion as a lateral bright-dark-boundary, wherein at least a portion of the surface of the light tunnel is part of an ellipsoid, $E(x,z;y) = E_{a_1,b_1}(z;y) \times E_{a_2,b_2}(x;y)$ Wherein $E_{a_1,b_1}(z;y)$ and $E_{a_2,b_2}(x;y)$ are two crossed ellipses, wherein z is a coordinate in a longitudinal direction of the light tunnel, wherein x is a coordinate in the lateral direction, wherein y is a coordinate orthogonal to the x-direction and orthogonal to the z-direction, wherein $$E_{a_1,b_1}(z; y): \frac{z^2}{a_1^2} + \frac{y^2}{b_1^2} = 1$$

$$E_{a_2,b_2}(x; y): \frac{x^2}{a_2^2} + \frac{y^2}{b_2^2} = 1$$

wherein $1.9 \cdot b1 \leq a2$.

14. The headlight lens of claim 13, wherein the transition portion comprises an M-shaped region along a longitudinal direction of the light tunnel.

15. The headlight lens of claim 13, wherein $0 < a1/a2 \leq 1.5$.

16. The headlight lens of claim 15, wherein $a2 \leq 20 \cdot b1$.

17. The headlight lens of claim 16, a first side face of the light tunnel being at least partially concavely curved.

18. The headlight lens of claim 17, a second side face of the light tunnel, opposite the first side face, being at least partially concavely curved.

19. The headlight lens of claim 18, the second side face of the light tunnel being not symmetric to the first side face.

20. The headlight lens of claim 19, wherein the transition portion comprises an M-shaped region along a longitudinal direction of the light tunnel.

* * * * *